United States Patent
Matsui et al.

(10) Patent No.: US 10,403,882 B2
(45) Date of Patent: Sep. 3, 2019

(54) SECONDARY BATTERY-USE ACTIVE MATERIAL, SECONDARY BATTERY-USE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

(71) Applicant: Murata Manufacturing Co., Ltd., Kyoto (JP)

(72) Inventors: Takaaki Matsui, Fukushima (JP); Kyohei Ogawa, Fukushima (JP); Masaki Kuratsuka, Fukushima (JP)

(73) Assignee: Murata Manufacturing Co., Ltd., Kyoto (JP)

(*) Notice: Subject to any disclaimer, the term of this patent is extended or adjusted under 35 U.S.C. 154(b) by 104 days.

(21) Appl. No.: 15/518,344

(22) PCT Filed: Oct. 26, 2015

(86) PCT No.: PCT/JP2015/080056
§ 371 (c)(1),
(2) Date: Apr. 11, 2017

(87) PCT Pub. No.: WO2016/088471
PCT Pub. Date: Jun. 9, 2016

(65) Prior Publication Data
US 2017/0309891 A1   Oct. 26, 2017

(30) Foreign Application Priority Data
Dec. 1, 2014 (JP) ................................ 2014-243162

(51) Int. Cl.
*H01M 4/131* (2010.01)
*C01F 7/04* (2006.01)
(Continued)

(52) U.S. Cl.
CPC ............ *H01M 4/131* (2013.01); *C01F 7/043* (2013.01); *C01G 53/42* (2013.01); *H01M 4/364* (2013.01); *H01M 4/485* (2013.01); *H01M 4/505* (2013.01); *H01M 4/525* (2013.01); *H01M 10/0525* (2013.01); *C01P 2002/74* (2013.01); *H01M 10/052* (2013.01); *Y02E 60/122* (2013.01)

(58) Field of Classification Search
CPC ...... H01M 4/131; H01M 10/0525; C10F 7/04; C10F 7/043
See application file for complete search history.

(56) References Cited

U.S. PATENT DOCUMENTS

2012/0003541 A1* 1/2012 Song ................. H01M 4/364
429/223
2012/0282524 A1 11/2012 Kono et al.
(Continued)

FOREIGN PATENT DOCUMENTS

JP   2003-017056 A   1/2003
JP   2003017056 A *  1/2003 ............ H01M 4/58
(Continued)

OTHER PUBLICATIONS

International Search Report (with English translation) dated Jan. 26, 2016 in corresponding international application No. PCT/JP2015/080056 (4 pages).
(Continued)

*Primary Examiner* — Karie O'Neill Apicella
(74) *Attorney, Agent, or Firm* — K&L Gates LLP

(57) ABSTRACT

The present invention provides a secondary battery-use active material that allows for an improvement in thermal stability after charge and discharge are repeated. The secondary battery-use active material of the present invention includes a cathode active material that includes (A) a main phase and a sub-phase, (B) the main phase containing a first lithium compound represented by $Li_aNi_bM_cAl_dO_e$ (where M is an element such as cobalt, and $0.8<a<1.2$, $0.45 \le b \le 1$, $0 \le c \le 1$, $0 \le d \le 0.2$, $0 < e \le 1.98$, $(c+d)>0$, and $(b+c+d) \le 1$), and (C) the sub-phase containing a second lithium compound that contains lithium, aluminum, and oxygen as constituent elements.

12 Claims, 8 Drawing Sheets

(51) Int. Cl.
  _H01M 10/0525_  (2010.01)
  _H01M 4/485_  (2010.01)
  _H01M 4/505_  (2010.01)
  _H01M 4/525_  (2010.01)
  _C01G 53/00_  (2006.01)
  _H01M 4/36_  (2006.01)
  _H01M 10/052_  (2010.01)

(56) References Cited

U.S. PATENT DOCUMENTS

2013/0082664 A1*  4/2013  Hiraoka ............ H01M 10/0525
                                                    320/149
2016/0043398 A1   2/2016  Yanagihara et al.

FOREIGN PATENT DOCUMENTS

| JP | 2011-023121 A | 2/2011 |
| JP | 2012-015110 A | 1/2012 |
| JP | 2014-026819 A | 2/2014 |
| JP | 2014-175238 A | 9/2014 |
| WO | 2012/086273 A | 6/2012 |

OTHER PUBLICATIONS

Written Opinion dated Jan. 26, 2016 in corresponding international application No. PCT/JP2015/080056 (4 pages).
Chinese Office Action dated Jun. 3, 2019 in corresponding Chinese Application No. 201580064380.8.

* cited by examiner

[FIG. 1]
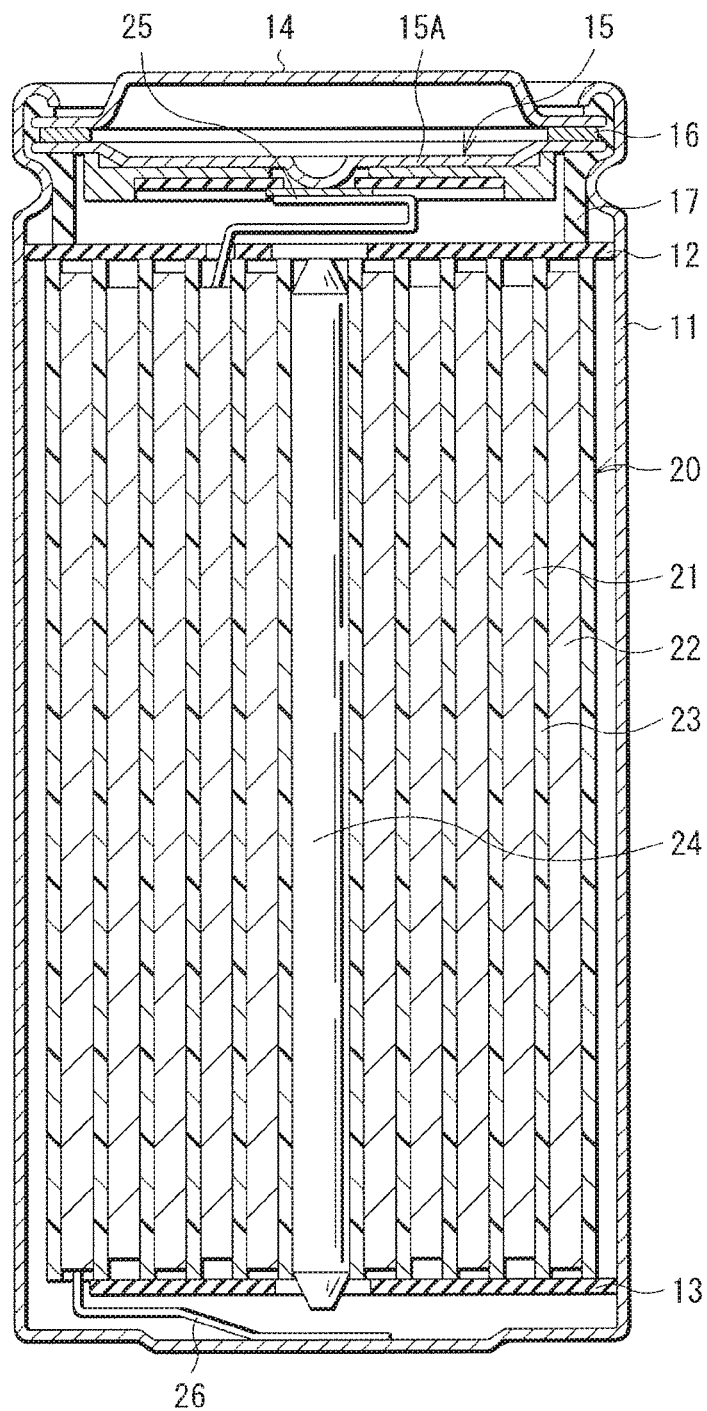

[FIG. 2]
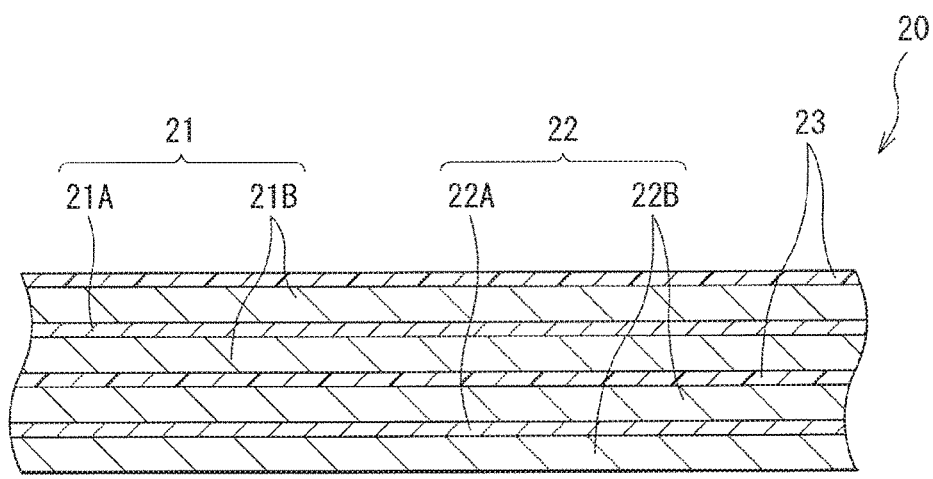

[FIG. 3]
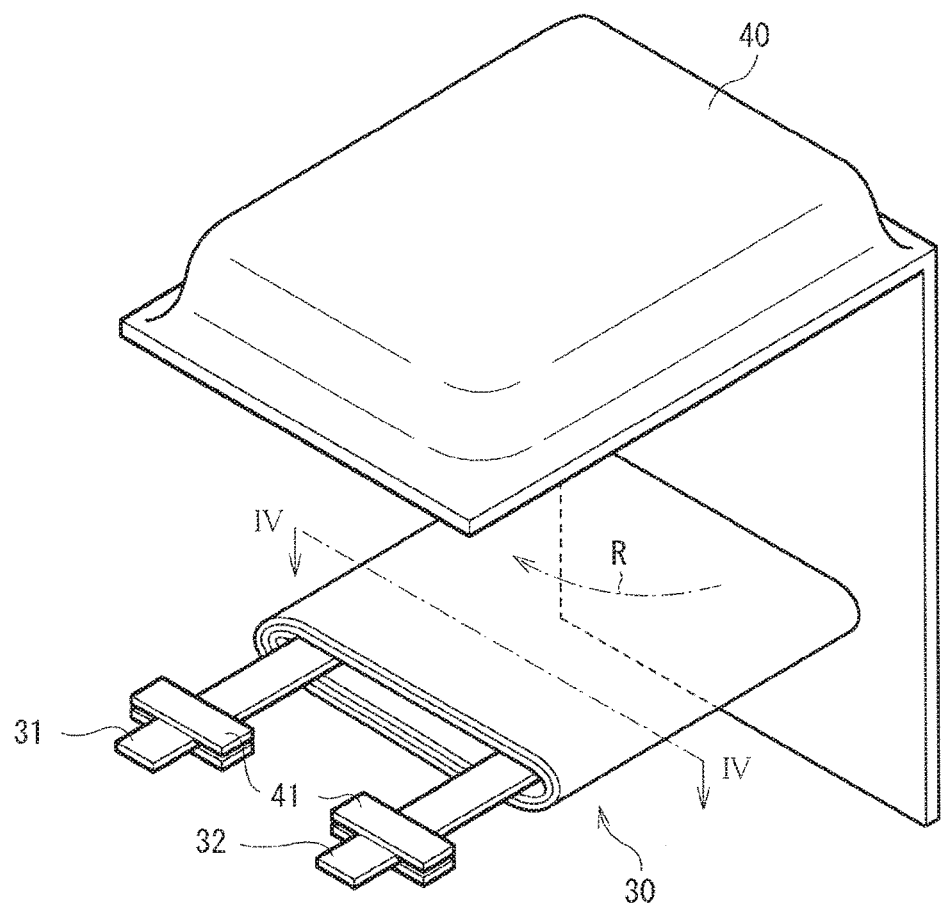

[ FIG. 4 ]
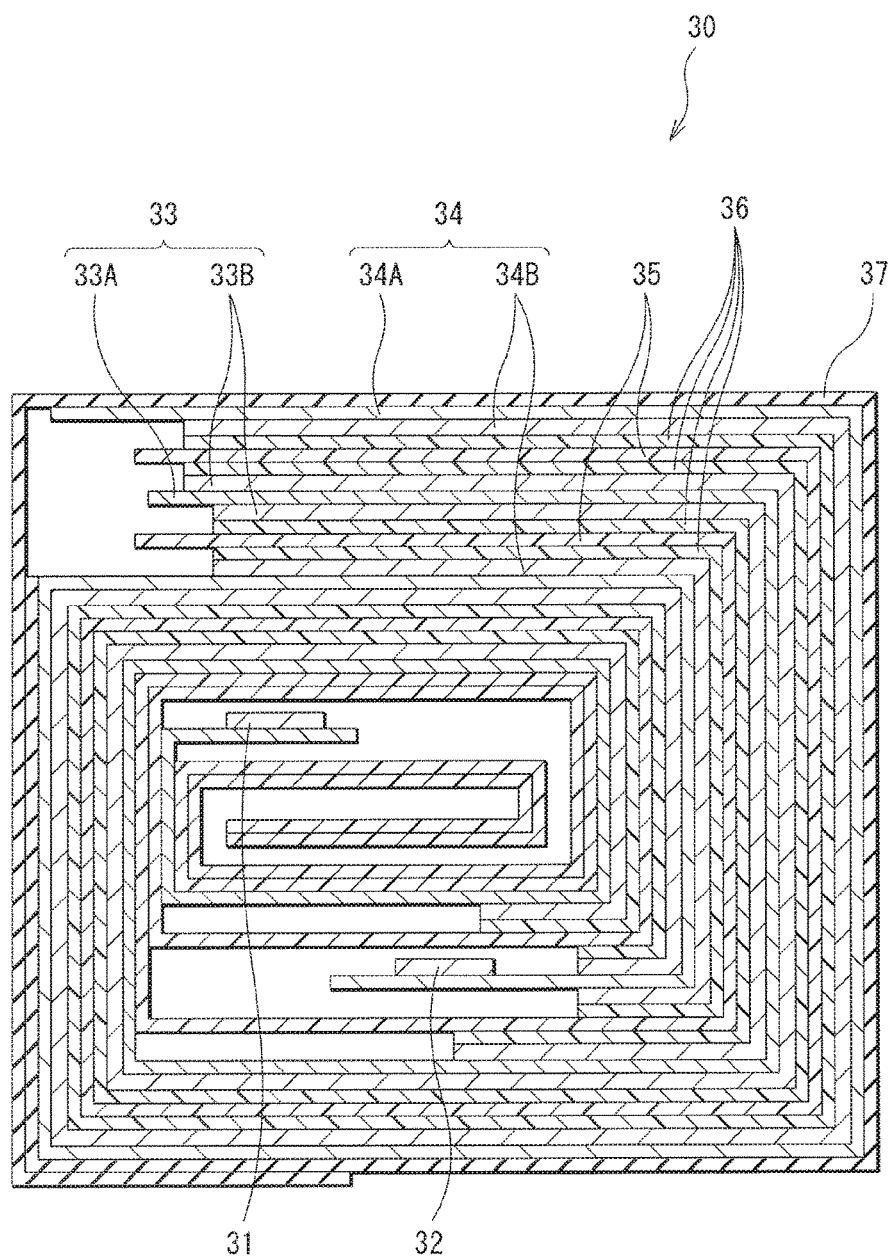

[ FIG. 5 ]
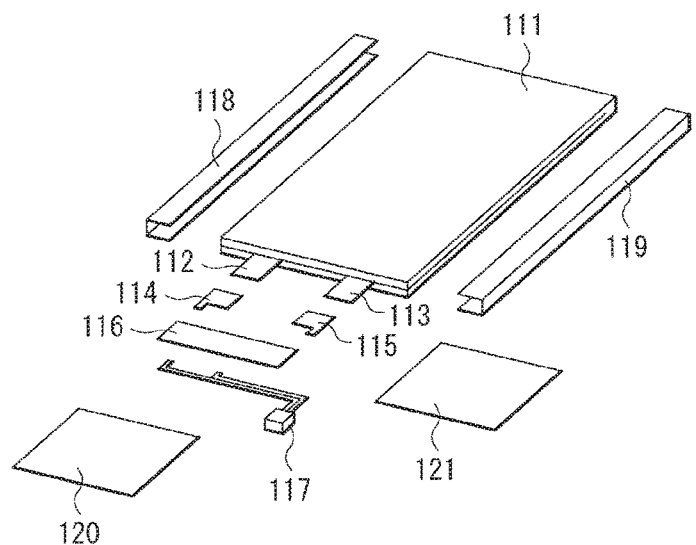
[ FIG. 6 ]
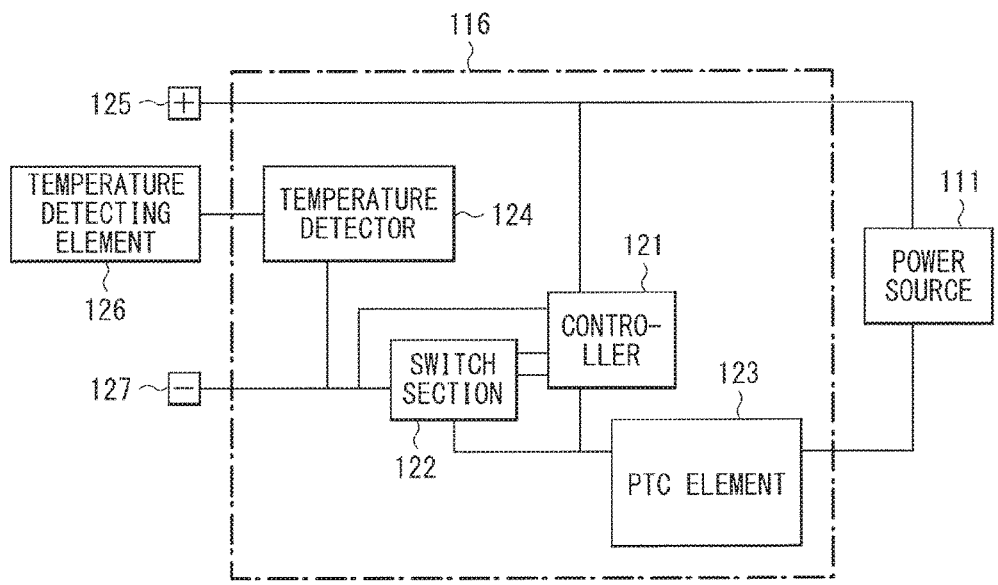

[FIG. 7]
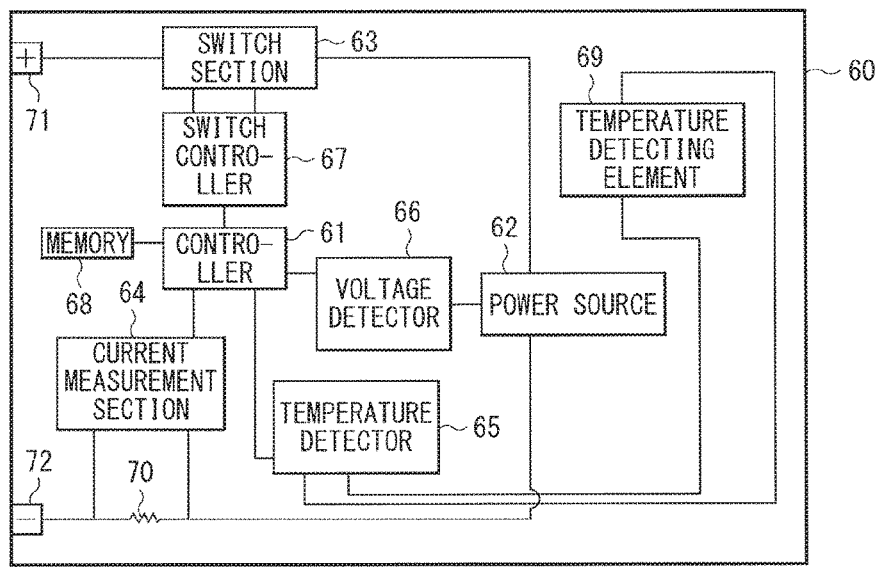
[FIG. 8]
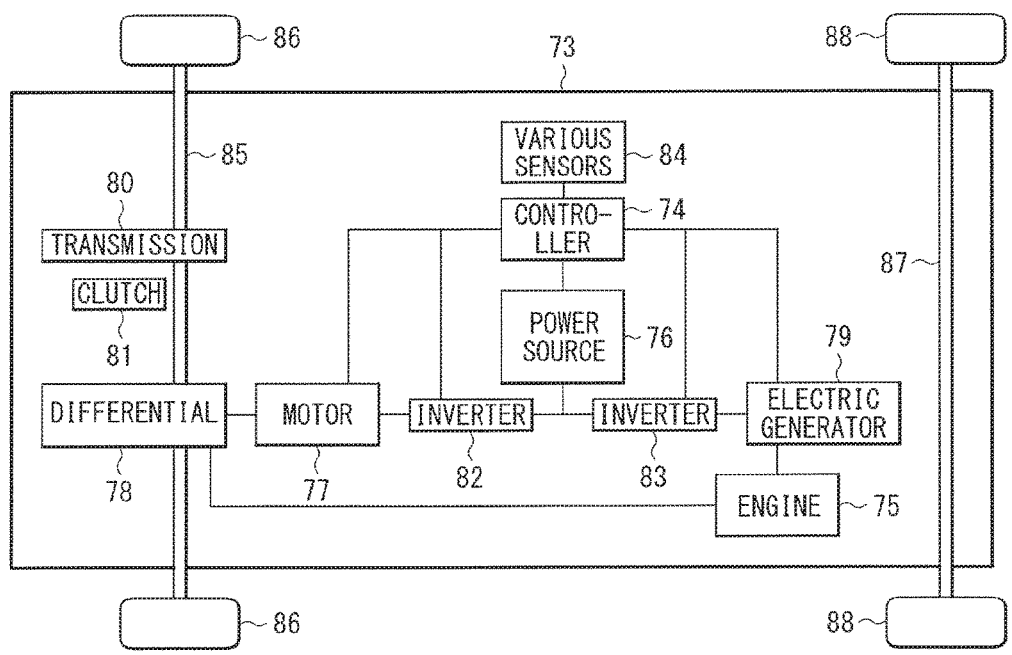

[ FIG. 9 ]
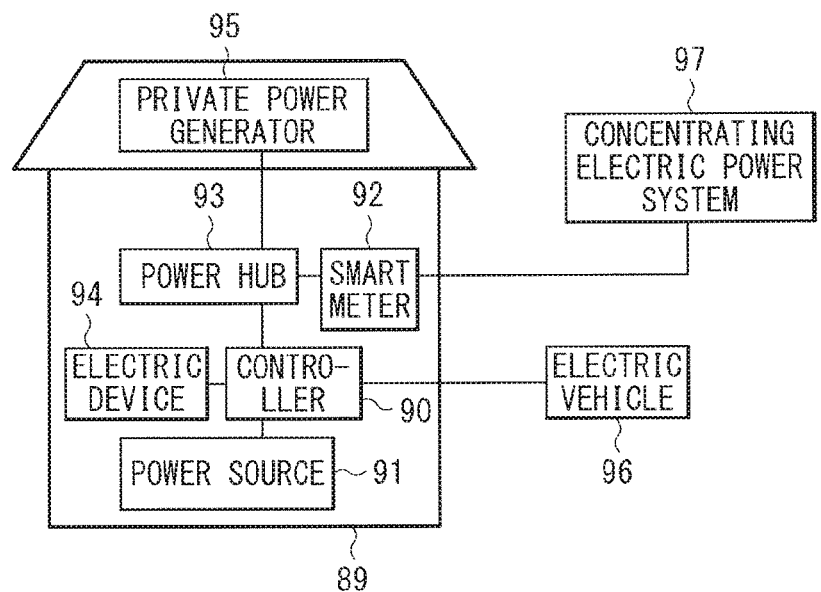
[ FIG. 10 ]
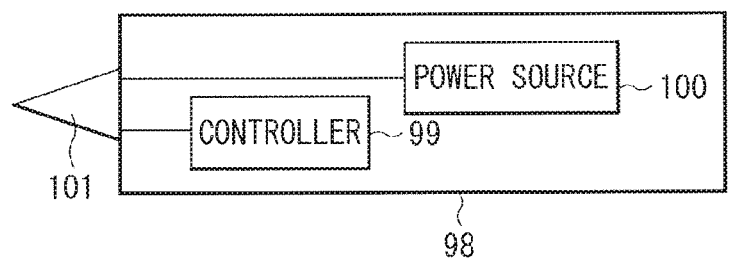

[FIG. 11]
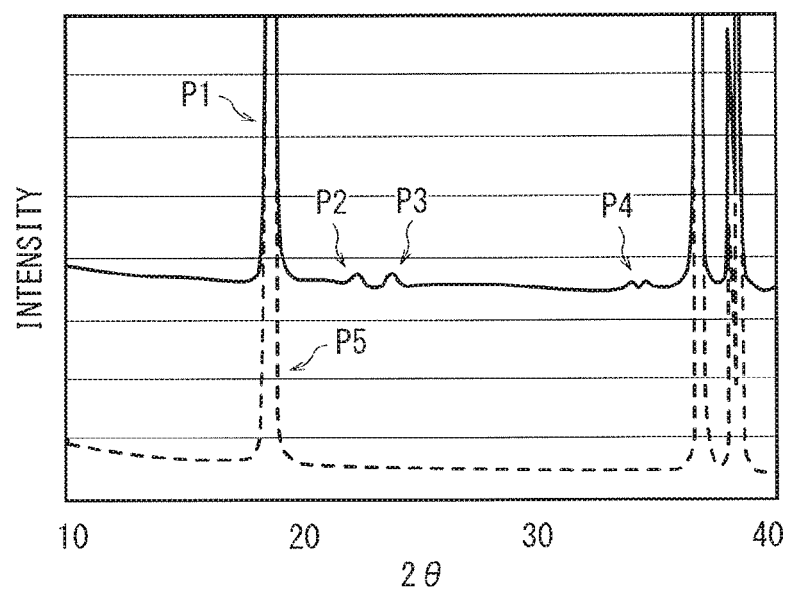

SECONDARY BATTERY-USE ACTIVE MATERIAL, SECONDARY BATTERY-USE ELECTRODE, SECONDARY BATTERY, BATTERY PACK, ELECTRIC VEHICLE, ELECTRIC POWER STORAGE SYSTEM, ELECTRIC POWER TOOL, AND ELECTRONIC APPARATUS

CROSS-REFERENCE TO RELATED APPLICATIONS

The present application claims the benefit of International Application No. PCT/JP2015/080056, filed Oct. 26, 2015, which claims priority to Japanese Application No. 2014-243162, filed Dec. 1, 2014, the disclosures of which are incorporated herein by reference.

BACKGROUND

The present technology relates to a active material used for a secondary battery, an electrode and a secondary battery each of which uses the active material, and a battery pack, an electric vehicle, an electric power storage system, an electric power tool, and an electronic apparatus each of which uses the secondary battery.

Various electronic apparatuses such as mobile phones and personal digital assistants (PDAs) have been widely used, and it has been demanded to further reduce size and weight of the electronic apparatuses and to achieve their longer lives. Accordingly, batteries, in particular, small and light-weight secondary batteries that have ability to achieve high energy density have been developed as power sources for the electronic apparatuses.

Applications of the secondary batteries are not limited to the electronic apparatuses described above, and it has been also considered to apply the secondary batteries to various other applications. Examples of such other applications may include: a battery pack attachably and detachably mounted on, for example, an electronic apparatus; an electric vehicle such as an electric automobile; an electric power storage system such as a home electric power server; and an electric power tool such as an electric drill.

There have been proposed secondary batteries that utilize various charge and discharge principles in order to obtain battery capacity. In particular, attention has been paid to a secondary battery that utilizes insertion and extraction of an electrode reactant and a secondary battery that utilizes precipitation and dissolution of an electrode reactant, which make it possible to achieve higher energy density than other batteries such as a lead-acid battery and a nickel-cadmium battery.

The secondary battery includes an electrode and an electrolytic solution. The electrode includes an active material participating in charge-discharge reaction. The configuration of the active material exerts a large influence on battery characteristics. Accordingly, various studies have been conducted on the configuration of the active material.

More specifically, in order to improve charge-discharge cycle characteristics, a lithium-containing composite oxide represented by $Li_{1+y}MO_2$ (where M is an element such as Ni and Al) is used (for example, refer to PTL 1). In order to suppress gas generation during charge, a complex of a lithium-aluminum oxide represented by $Li_aAl_xO_b$ and lithium-nickel oxide is used (for example, refer to PTL 2). In order to suppress an increase in internal resistance, a lithium transition metal composite oxide represented by $LiNi_xCo_yAl_zO_2$ is used (for example, refer to PTL 3). In order to achieve superior cycle characteristics, a lithium composite oxide represented by $Li_xNi_{1-y-z}Co_yMn_zO_2$ is used (for example, refer to PTL 4). In order to improve battery characteristics after moisture absorption, an additive represented by $Li_xM_yO_2$ (where M is an element such as Al) is used together with a cathode active material, (for example, refer to PTL 5).

CITATION LIST

Patent Literature

PTL 1: WO 2012/086273
PTL 2: Japanese Unexamined Patent Application Publication No. 2012-015110
PTL 3: Japanese Unexamined Patent Application Publication No. 2003-017056
PTL 4: Japanese Unexamined Patent Application Publication No. 2011-023121
PTL 5: Japanese Unexamined Patent Application Publication No. 2014-026819

SUMMARY

In association with higher performance and more multi-functionality of electronic apparatuses and other apparatuses described above, the electronic apparatuses and the other apparatuses are more frequently used, and usage environment thereof expands. For this reason, there is still room for improvement in battery characteristics of the secondary batteries.

It is therefore desirable to provide a secondary battery-use active material, a secondary battery-use electrode, a secondary battery, a battery pack, an electric vehicle, an electric power storage system, an electric power tool, and an electronic apparatus each of which makes it possible to achieve superior battery characteristics.

A secondary battery-use active material according to an embodiment of the present technology includes: a cathode that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements; an anode; and an electrolytic solution $$Li_aNi_bM_cAl_dO_e \qquad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45 \le b \le 1$, $0 \le c \le 1$, $0 \le d \le 0.2$, $0 < e \le 1.98$, $(c+d)>0$, and $(b+c+d) \le 1$.

A secondary battery-use electrode according to an embodiment of the present technology includes an active material, and the active material has a similar configuration to that of the secondary battery-use active material according to the foregoing embodiment of the present technology.

A secondary battery according to an embodiment of the present technology includes: a cathode; an anode; and an electrolyte, and the cathode has a similar configuration to that of the secondary battery-use electrode according to the foregoing embodiment of the present technology.

A battery pack, an electric vehicle, an electric power storage system, an electric power tool, and an electronic apparatus according to respective embodiments of the present technology each include a secondary battery, and the secondary battery has a configuration similar to that of the secondary battery according to the foregoing embodiment of the present technology.

The secondary battery-use active material according to the embodiment of the present technology here is one material (non-mixed material) including the main phase and the sub-phase, as described above. In other words, the secondary battery-use active material according to the embodiment of the present technology is not a mixture of one or more materials having a composition corresponding to a composition of the main phase and one or more materials having a composition corresponding to a composition of the sub-phase.

In order to confirm that the active material is one material including the main phase and the sub-phase, for example, the active material may be analyzed with use of, for example, an X-ray absorption fine structure (XAFS) method to examine the presence or absence of the main phase and the presence or absence of the sub-phase. Moreover, in order to examine the composition of the main phase and the composition of the sub-phase, for example, the active material may be analyzed with use of, for example, an X-ray diffraction (XRD) method.

According to the secondary battery-use active material, the secondary battery-use electrode, and the secondary battery of the respective embodiments of the present technology, the active material satisfies the foregoing conditions (A) to (C), which makes it possible to achieve superior battery characteristics. Moreover, in each of the battery pack, the electric vehicle, the electric power storage system, the electric power tool, and the electronic apparatus of the respective embodiment of the present technology, similar effects are achievable.

Note that effects described here are non-limiting. Effects achieved by the present technology may be one or more of effects described in the present technology.

BRIEF DESCRIPTION OF THE DRAWINGS

FIG. 1 is a cross-sectional view of a configuration of a secondary battery (cylindrical type) according to an embodiment of the present technology.

FIG. 2 is a cross-sectional view of part of a spirally wound electrode body illustrated in FIG. 1.

FIG. 3 is a perspective view of a configuration of another secondary battery (laminated film type) according to the embodiment of the present technology.

FIG. 4 is a cross-sectional view taken along a line IV-IV of a spirally wound electrode body illustrated in FIG. 3.

FIG. 5 is a perspective view of a configuration of an application example (a battery pack: single battery) of the secondary battery.

FIG. 6 is a block diagram illustrating a configuration of the battery pack illustrated in FIG. 5.

FIG. 7 is a block diagram illustrating a configuration of an application example (a battery pack: assembled battery) of the secondary battery.

FIG. 8 is a block diagram illustrating a configuration of an application example (an electric vehicle) of the secondary battery.

FIG. 9 is a block diagram illustrating a configuration of an application example (an electric power storage system) of the secondary battery.

FIG. 10 is a block diagram illustrating a configuration of an application example (an electric power tool) of the secondary battery.

FIG. 11 is a diagram illustrating a result of analysis of a cathode active material using an X-ray diffraction method.

DETAILED DESCRIPTION

In the following, some embodiments of the present technology are described in detail with reference to the drawings. It is to be noted that description is given in the following order.

1. Secondary Battery-Use Active Material
2. Secondary Battery-Use Electrode and Secondary Battery
 2-1. Lithium-Ion Secondary Battery (Cylindrical Type)
 2-2. Lithium-Ion Secondary Battery (Laminated Film Type)
 2-3. Lithium Metal Secondary Battery
3. Applications of Secondary Battery
 3-1. Battery Pack (Single Battery)
 3-2. Battery Pack (Assembled Battery)
 3-3. Electric Vehicle
 3-4. Electric Power Storage System
 3-5. Electric Power Tool <1. Secondary Battery-Use Active Material>

First, description is given of a secondary battery-use active material (hereinafter, simply referred to as "active material") according to an embodiment of the present technology.

The active material described here may be used for, for example, a secondary battery such as a lithium-ion secondary battery. However, the kind of the secondary battery using the active material is not limited to the lithium-ion secondary battery. Moreover, the active material may be used as a cathode active material or an anode active material.

[Whole Configuration of Active Material]

The active material includes a main phase and a sub-phase. In other words, the active material is one material (non-mixed material) including a main phase and a sub-phase, as described above, and is not a mixture. The mixture means a mixture of one or more materials having a composition corresponding to a composition of the main phase and one or more materials having a composition corresponding to a composition of the sub-phase.

For confirmation, the "mixture" means a mixture of two or more materials; therefore, it is possible to separate the mixture into the two or more materials with use of some method. In contrast, the "non-mixed material" is inherently one material; therefore, it is not possible to separate the non-mixed material into two or more materials even with use of some method.

[Main Phase]

The main phase contains one or more of compounds (first lithium compounds) represented by the following formula (1).

$$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45 \leq b \leq 1$, $0 \leq c \leq 1$, $0 \leq d \leq 0.2$, $0<e \leq 1.98$, $(c+d)>0$, and $(b+c+d) \leq 1$.

The first lithium compound is a lithium composite oxide containing, as constituent elements, nickel (Ni), aluminum (Al), and a metal element (an additional metal element: M) other than nickel and aluminum, and has a layered rock-salt crystal structure.

As can be seen from a range of values that "a" possibly takes (a>0.8) and a range of values that "b" possibly takes ($b \geq 0.45$), the first lithium compound contains lithium (Li) and nickel as constituent elements. In contrast, as can be seen from a range of values that "c" possibly takes ($c \geq 0$), the first lithium compound may or may not contain the additional metal element. Similarly, as can be seen from a range of values that "d" possibly takes ($d \geq 0$), the first lithium compound may or may not contain aluminum as a constituent element. However, as can be seen from a range of values that (c+d) possibly takes ((c+d)>0), the first lithium compound contains one or both of the additional metal element and aluminum as constituent elements.

As can be seen from a range of values that "e" possibly takes ($e \leq 1.98$), the value of "e" that determines an atomic ratio of oxygen (O) is less than 2. In other words, in the crystalline structure of the first lithium compound, a so-called crystal defect (an oxygen atom defect) is caused by including the sub-phase together with the main phase. In a secondary battery using the active material that includes the main phase and the sub-phase, thermal stability is improved after repeating charge and discharge.

In particular, the foregoing "e" may preferably satisfy $1.61 \leq e \leq 1.98$, and more preferably satisfy $1.75 \leq e \leq 1.98$, which allows for a further improvement in thermal stability of the secondary battery after charge and discharge.

The kind of the additional metal element (M) is not particularly limited, as long as the additional element is one or more of the elements mentioned above such as cobalt. In particular, the additional metal element may be preferably an element such as cobalt, manganese, titanium, and magnesium, which allows for a further improvement in thermal stability of the secondary battery after charge and discharge.

The kind of the first lithium compound is not particularly limited, as long as the first lithium compound is a compound having a composition represented by the formula (1). Specific examples of the first lithium compound may include $LiNi_{0.8}Co_{0.15}Al_{0.05}O_{1.98}$, $LiNi_{0.45}Co_{0.2}Mn_{0.3}Al_{0.05}O_{1.98}$, $LiNi_{0.8}Co_{0.15}Mg_{0.05}O_{1.98}$, and $LiNi_{0.8}Co_{0.15}Ti_{0.05}O_{1.98}$.

It is to be noted that using one or more of existing analysis methods makes it possible to specify whether the active material is one material including the main phase and the sub-phase. More specifically, for example, the active material may be analyzed with use of a method such as an XAFS method to examine the presence or absence of the main phase and the presence or absence of the sub-phase, as described above.

Moreover, using one or more of existing analysis methods makes it possible to specify the composition of the main phase. More specifically, for example, the active material may be analyzed with use of a method such as an XRD method, as described above.

[Sub-Phase]

The sub-phase contains one or more of compounds (second lithium compounds) containing lithium, aluminum, and oxygen (O) as constituent elements. Part or the entirety of the sub-phase forms a solid solution with the main phase.

The second lithium compound is a lithium-aluminum-containing oxide, and an atomic ratio of each of lithium, aluminum, and oxygen is not particularly limited. The second lithium compound may or may not contain one or more of other elements (excluding lithium, aluminum, and oxygen) as constituent elements.

The kind of the second lithium compound is not particularly limited, as long as the second lithium compound is a compound containing lithium, aluminum, and oxygen. Specific examples of the second lithium compound may include $LiAlO_2$ and $Li_5AlO_4$.

It is to be noted that, for example, whether the active material includes the sub-phase may be determined by analyzing the active material with use of a method such as an XAFS method to examine the presence or absence of the sub-phase, as described above.

Further, using one or more of existing analysis methods makes it possible to specify the composition of the sub-phase. More specifically, for example, the active material may be analyzed with use of a method such as an XRD method, as described above.

[Physical Characteristics]

The foregoing active material including the main phase and the sub-phase may preferably have the following physical characteristics.

Firstly, the active material including the main phase and the sub-phase is analyzed with use of an XRD method. As a result, one or more peaks (first peaks) resulting from (003) plane of the main phase (a space group R-3m) and one or more peaks (second peaks) resulting from the sub-phase are detected.

In this case, a ratio IP of maximum intensity I2 with respect to maximum intensity I1 may preferably satisfy $0.001 \leq IP \leq 1$, where the maximum intensity I1 is a maximum value (maximum intensity) of intensity of one or more first peaks and the maximum intensity I2 is a maximum value (maximum intensity) of intensity of one or more second peaks. This makes a presence ratio of the main phase and the sub-phase appropriate, thereby further improving the thermal stability of the secondary battery after charge and discharge. It is to be noted that the ratio IP is represented by $IP=[I2/I1] \times 100$.

Secondly, an average valence V of nickel, the additional metal element (M), and aluminum may preferably satisfy $2.5 \leq V \leq 2.9$, which makes a crystal state of the active material including the main phase and the sub-phase appropriate, thereby further improving the thermal stability of the secondary battery after charge and discharge.

In order to determine the average valence V, in a procedure to be described below, the active material may be analyzed by an XRD method, and thereafter, Rietvelt analysis may be performed on the basis of a result (an XRD pattern) of the analysis. It is to be noted that, for example, a case in which the active material of the present technology is used as a cathode active material is described below.

First, a secondary battery using the active material of the present technology as a cathode active material may be prepared. The secondary battery may be, for example, a secondary battery that has not been subjected to charge and discharge after manufacturing, or a secondary battery that has been subjected to only one to ten cycles of charge and discharge after manufacturing. Examples of the latter secondary battery may include an unused secondary battery having been commercially available. Usage history of the secondary battery (charge and discharge is performed or not) hardly exerts on measurement and analysis that are to be described later.

Subsequently, the secondary battery may be charged and discharged. When the secondary battery is charged, charge may be performed at a current of 0.1 C until a voltage reaches 4.2 V, and thereafter the secondary battery may be charged at the voltage of 4.2 V until a current reaches 100 mA. When the secondary battery is discharged, discharge may be performed at a current of 0.1 C until the voltage reaches 2.5 V. Note that "0.1 C" refers to a current value at which the battery capacity (theoretical capacity) is completely discharged in 10 hours.

Next, the cathode may be taken out of the secondary battery in a discharged state, and thereafter, the cathode active material may be collected from the cathode. Subsequently, the cathode active material may be analyzed with use of a powder X-ray diffraction method, and thereafter, Rietvelt analysis may be performed with use of analysis software. A CuKα ray may be used as an X-ray source. The analysis software may be, for example, RIETAN2000.

Rietvelt analysis is an analysis method in which a parameter relating to a crystalline structure is refined mainly on the basis of diffraction intensity obtained from a result (an XRD pattern) of analysis by an XRD method. In the analysis method, various parameters relating to the crystalline structure are refined so as to cause an XRD pattern derived by calculation on the basis of an assumed crystalline structure model and an XRD pattern actually measured to coincide with each other, thereby obtaining a result of analysis of the XRD pattern.

Lastly, the average valence V may be calculated from a calculation formula $S_{ij}=(l_{ij}/l_0)^{-N}$ on the basis of a crystalline structure diagram obtained by the result of the analysis. The average valence is derived by applying the rule of local charge neutrality to a bond of a cation and an anion in a crystal. Brown and Shannon have represented an average valence of a cation and an anion as a function of an actually measured interatomic distance. It is to be noted that "i" is a cation, "j" is an anion, and "$l_0$" and "N" are parameters refined by least-squares so as to cause the average valence V to become a value close to a formal charge of the cation in a large number of compounds configured of a pair of the cation and the anion.

[Method of Manufacturing Active Material]

The active material may be manufactured by the following procedure, for example.

First, a nickel compound and an additional metal compound may be mixed, and thereafter, deionized water may be added to a resultant mixture to prepare a nickel water solution.

The nickel compound may include, for example, one or more of nickel compounds such as nickel sulfate ($NiSO_4$) and nickel nitrate ($NiNO_3$). The kind of the additional metal compound may vary depending on the kind of the additional metal element. The additional metal compound in a case in which the additional metal element is cobalt may include, for example, one or more of metal compounds such as cobalt sulfate ($CoSO_4$) and cobalt nitrate ($CoNO_3$). The additional metal compound in a case in which the additional metal element is manganese may include, for example, one or more of metal compounds such as manganese sulfate ($MnSO_4$) and manganese nitrate ($MnNO_3$). The additional metal compound in a case in which the additional metal element is magnesium may include, for example, one or more of metal compounds such as magnesium sulfate ($MgSO_4$) and magnesium nitrate ($MgNO_3$). The additional metal compound in a case in which the additional metal element is titanium may include, for example, one or more of metal compounds such as titanium sulfate ($TiSO_4$) and titanium nitrate ($TiNO_3$).

Subsequently, ammonia water may be added little by little to the nickel water solution under an alkaline condition in an atmosphere of an inert gas. The inert gas may include, for example, one or more of gases such as argon (Ar) and nitrogen ($N_2$). Thus, the nickel water solution and ammonia water may react with each other, thereby obtaining a deposit (a nickel hydroxide).

Next, deionized water may be added to the nickel hydroxide to prepare a nickel hydroxide water solution. Subsequently, an aluminum compound may be added to the nickel hydroxide water solution under an alkaline condition. The aluminum compound may include, for example, one or more of aluminum compounds such as sodium aluminate ($NaAlO_2$) and aluminum phosphate ($AlPO_4$). In this case, the entire amount of the aluminum compound may be added at once to the nickel hydroxide water solution, and thereafter, the nickel hydroxide water solution may be stirred. Thus, the nickel hydroxide water solution and the aluminum compound may react with each other, thereby obtaining a deposited mixture (a mixture of the nickel hydroxide and aluminum hydroxide).

Next, a lithium compound may be added to the deposited mixture to obtain a lithium mixture. The lithium compound may include, for example, one or more of lithium compounds such as lithium hydroxide (LiOH) and lithium carbonate ($Li_2CO_3$). Subsequently, the lithium mixture may be put into a mixer, and thereafter, the lithium mixture may be granulated while being sufficiently mixed with use of the mixer in an atmosphere of an inert gas to obtain an active material precursor.

Lastly, the active material precursor may be fired in an oxygen ($O_2$) atmosphere, thereby obtaining the active material. A firing temperature is not particularly limited.

In this case, mainly in the foregoing process of manufacturing the active material, a crystal defect (an oxygen atom defect) is intentionally caused in the crystalline structure by adding the entire amount of the aluminum compound at once to the nickel hydroxide water solution. Thus, the foregoing active material including the main phase and the sub-phase is obtained. In other words, the main phase contains the first lithium compound, and the sub-phase contains the second lithium compound.

[Action and Effects of Active Material]

The active material includes the main phase containing the first lithium compound and the sub-phase containing the second lithium compound, which makes it possible to improve thermal stability of the secondary battery using the active material after repeating charge and discharge, as described above. Accordingly, it is possible to improve battery characteristics in the secondary battery using the active material.

In particular, in the first lithium compound, "e" that determines the atomic ratio of oxygen satisfies $1.75 \le e \le 1.98$, which makes it possible to achieve a higher effect.

Moreover, the second lithium compound contains one or both of $LiAlO_2$ and $Li_5AlO_4$, which makes it possible to achieve a higher effect.

Further, the ratio IP satisfies $0.001 \le IP \le 1$, or the average valence V satisfies $2.5 \le V \le 2.9$, which makes it possible to achieve a higher effect.

<2. Secondary Battery-Use Electrode and Secondary Battery>

Next, description is given of a secondary battery-use electrode and a secondary battery each of which uses the foregoing active material of the present technology.

<2-1. Lithium-Ion Secondary Battery (Cylindrical Type)>

FIG. 1 illustrates a cross-sectional configuration of a secondary battery. FIG. 2 illustrates a cross-sectional configuration of part of a spirally wound electrode body 20 illustrated in FIG. 1.

The secondary battery described here may be, for example, a lithium-ion secondary battery in which a capacity of an anode 22 is obtained by insertion and extraction of lithium as an electrode reactant.

[Whole Configuration of Secondary Battery]

The secondary battery has a so-called cylindrical type battery configuration. The secondary battery may contain, for example, a pair of insulating plates 12 and 13 and the spirally wound electrode body 20 as a battery element inside a battery can 11 having a substantially hollow cylindrical shape, as illustrated in FIG. 1. In the spirally wound electrode body 20, for example, a cathode 21 and the anode 22 may be stacked with a separator 23 in between, and the cathode 21, the anode 22, and the separator 23 may be spirally wound. The spirally wound electrode body 20 may be impregnated with, for example, an electrolytic solution that is a liquid electrolyte.

The battery can 11 may have, for example, a hollow structure in which one end of the battery can 11 is closed and the other end of the battery can 11 is open. The battery can 11 may be made of one or more of, for example, iron (Fe), aluminum (Al), and an alloy thereof. It is to be noted that a surface of the battery can 11 may be plated with, for example, nickel. The pair of insulating plates 12 and 13 may be so disposed as to sandwich the spirally wound electrode body 20 in between and extend perpendicularly to a spirally wound periphery surface of the spirally wound electrode body 20.

At the open end of the battery can 11, a battery cover 14, a safety valve mechanism 15, and a positive temperature coefficient device (PTC device) 16 may be swaged with a gasket 17, by which the battery can 11 is hermetically sealed. The battery cover 14 may be made of, for example, a material similar to the material of the battery can 11. Each of the safety valve mechanism 15 and the PTC device 16 may be provided on the inner side of the battery cover 14, and the safety valve mechanism 15 may be electrically coupled to the battery cover 14 via the PTC device 16. In the safety valve mechanism 15, when an internal pressure of the battery can 11 reaches a certain level or higher as a result of, for example, internal short circuit or heating from outside, a disk plate 15A inverts. This cuts electric connection between the battery cover 14 and the spirally wound electrode body 20. In order to prevent abnormal heat generation resulting from a large current, resistance of the PTC device 16 increases as a temperature rises. The gasket 17 may be made of, for example, an insulating material. A surface of the gasket 17 may be coated with, for example, asphalt.

For example, a center pin 24 may be inserted in the center of the spirally wound electrode body 20. However, the center pin 24 may not be inserted in the center of the spirally wound electrode body 20. A cathode lead 25 may be attached to the cathode 21, and an anode lead 26 may be attached to the anode 22. The cathode lead 25 may be made of, for example, a conductive material such as aluminum. For example, the cathode lead 25 may be attached to the safety valve mechanism 15, and may be electrically coupled to the battery cover 14. The anode lead 26 may be made of, for example, a conductive material such as nickel. For example, the anode lead 26 may be attached to the battery can 11, and may be electrically coupled to the battery can 11.

[Cathode]

The cathode 21 that is the secondary battery-use electrode of the present technology may include, for example, a cathode current collector 21A and a cathode active material layer 21B provided on both surfaces of the cathode current collector 21, as illustrated in FIG. 2. Alternatively, the cathode active material layer 21B may be provided on a single surface of the cathode current collector 21A.

The cathode current collector 21A may be made of, for example, one or more of conductive materials. The kind of the conductive material is not particularly limited, but may be, for example, a metal material such as aluminum (Al), nickel (Ni), and stainless steel. The cathode current collector 21A may be configured of a single layer or may be configured of multiple layers.

The cathode active material layer 21B may contain, as a cathode active material, one or more of the active materials of the present technology mentioned above. It is to be noted that the cathode active material layer 21B may further contain one or more of other materials such as a cathode binder and a cathode conductor, in addition to the cathode active material.

It is to be noted that the cathode active material may contain any other active material in addition to the active material of the present technology. The other active material may include one or more of cathode materials that have ability to insert and extract lithium.

The cathode material may be preferably a lithium-containing compound (excluding a compound corresponding to the active material of the present technology). More specifically, the cathode material may be preferably one or both of a lithium-containing composite oxide and a lithium-containing phosphate compound, which make it possible to achieve high energy density.

The lithium-containing composite oxide is an oxide that contains lithium and one or more elements that exclude lithium (hereinafter, referred to as "other elements") as constituent elements, and may have, for example, one or more of crystal structures such as a layered rock-salt crystal structure and a spinel crystal structure. The lithium-containing phosphate compound is a phosphate compound that contains lithium and one or more of the other elements as constituent elements, and may have, for example, one or more of crystal structures such as an olivine crystal structure.

The kinds of the other elements are not particularly limited, as long as the other elements are one or more of any elements. In particular, the other elements may be preferably one or more of elements that belongs to Groups 2 to 15 in the long form of the periodic table of the elements. More specifically, the other elements may more preferably include one or more of nickel (Ni), cobalt (Co), manganese (Mn), and iron (Fe), which make it possible to obtain a high voltage.

Examples of the lithium-containing composite oxide having the layered rock-salt crystal structure may include compounds represented by the following formulas (11) to (13).

$$Li_aMn_{(1-b-c)}Ni_bM1_cO_{(2-d)}F_e \quad (11)$$

where M1 is one or more of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr), and tungsten (W), "a" to "e" satisfy $0.8 \leq a \leq 1.2$, $0 < b < 0.5$, $0 \leq c \leq 0.5$, $(b+c) < 1$, $-0.1 \leq d \leq 0.2$, and $0 \leq e \leq 0.1$, it is to be noted that the composition of lithium varies depending on charge and discharge states, and "a" is a value in a completely-discharged state.

$$Li_aNi_{(1-b)}M2_bO_{(2-c)}F_d \quad (12)$$

where M2 is one or more of cobalt (Co), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \leq a \leq 1.2$, $0.005 \leq b \leq 0.5$, $-0.1 \leq c \leq 0.2$, and $0 \leq d \leq 0.1$, it is to be noted that the composition of lithium varies depending on charge and discharge states, and "a" is a value in a completely-discharged state.

$$Li_aCo_{(1-b)}M3_bO_{(2-c)}F_d \qquad (13)$$

where M3 is one or more of nickel (Ni), manganese (Mn), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.8 \le a \le 1.2$, $0 \le b < 0.5$, $-0.1 \le c \le 0.2$, and $0 \le d \le 0.1$, it is to be noted that the composition of lithium varies depending on charge and discharge states, and "a" is a value in a completely-discharged state.

Specific examples of the lithium-containing composite oxide having the layered rock-salt crystal structure may include $LiNiO_2$, $LiCoO_2$, $LiCo_{0.98}Al_{0.01}Mg_{0.01}O_2$, $LiNi_{0.5}Co_{0.2}Mn_{0.3}O_2$, $LiNi_{0.8}Co_{0.15}Al_{0.05}O_2$, $LiNi_{0.33}Co_{0.33}Mn_{0.33}O_2$, $Li_{1.2}Mn_{0.52}Co_{0.175}Ni_{0.1}O_2$, and $Li_{1.15}(Mn_{0.65}Ni_{0.22}Co_{0.13})O_2$.

It is to be noted that in a case in which the lithium-containing composite oxide having the layered rock-salt crystal structure includes nickel, cobalt, manganese, and aluminum as constituent elements, an atomic ratio of nickel may be preferably 50 at % or more, which makes it possible to achieve high energy density.

Examples of the lithium-containing composite oxide having the spinel crystal structure may include a compound represented by the following formula (14).

$$Li_aMn_{(2-b)}M4_bO_cF_d \qquad (14)$$

where M4 is one or more of cobalt (Co), nickel (Ni), magnesium (Mg), aluminum (Al), boron (B), titanium (Ti), vanadium (V), chromium (Cr), iron (Fe), copper (Cu), zinc (Zn), molybdenum (Mo), tin (Sn), calcium (Ca), strontium (Sr), and tungsten (W), "a" to "d" satisfy $0.9 \le a \le 1.1$, $0 \le b \le 0.6$, $3.7 \le c \le 4.1$, and $0 \le d \le 0.1$, it is to be noted that the composition of lithium varies depending on charge and discharge states, and "a" is a value in a completely-discharged state.

Specific examples of the lithium-containing composite oxide having the spinel crystal structure may include $LiMn_2O_4$.

Examples of the lithium-containing phosphate compound having the olivine crystal structure may include a compound represented by the following formula (15).

$$Li_aM5PO_4 \qquad (15)$$

where M5 is one or more of cobalt (Co), manganese (Mn), iron (Fe), nickel (Ni), magnesium (Mg), aluminum (Al), boron (B), titanium (Ti), vanadium (V), niobium (Nb), copper (Cu), zinc (Zn), molybdenum (Mo), calcium (Ca), strontium (Sr), tungsten (W), and zirconium (Zr), "a" satisfies $0.9 \le a \le 1.1$, it is to be noted that the composition of lithium varies depending on charge and discharge states, and "a" is a value in a completely-discharged state.

Specific examples of the lithium-containing phosphate compound having the olivine crystal structure may include $LiFePO_4$, $LiMnPO_4$, $LiFe_{0.5}Mn_{0.5}PO_4$, and $LiFe_{0.3}Mn_{0.7}PO_4$.

It is to be noted that the lithium-containing composite oxide may be, for example, a compound represented by the following formula (16).

$$(Li_2MnO_3)_x(LiMnO_2)_{1-x} \qquad (16)$$

where "x" satisfies $0 \le x \le 1$, it is to be noted that the composition of lithium varies depending on charge and discharge states, and "x" is a value in a completely-discharged state.

In addition, the cathode material may be, for example, one or more of an oxide, a disulfide, a chalcogenide, and a conductive polymer. Examples of the oxide may include titanium oxide, vanadium oxide, and manganese dioxide. Examples of the disulfide may include titanium disulfide and molybdenum sulfide. Examples of the chalcogenide may include niobium selenide. Examples of the conductive polymer may include sulfur, polyaniline, and polythiophene. It is to be noted that the cathode material may be any material other than the materials mentioned above.

The cathode binder may contain one or more of, for example, synthetic rubbers and polymer materials. Examples of the synthetic rubbers may include a styrene-butadiene-based rubber, a fluorine-based rubber, and ethylene propylene diene. Examples of the polymer material may include polyvinylidene fluoride and polyimide.

The cathode conductor may contain one or more of, for example, carbon materials. Examples of the carbon materials may include graphite, carbon black, acetylene black, and Ketjen black. Alternatively, the cathode conductor may be any other material such as a metal material and a conductive polymer, as long as the cathode conductor is a material having conductivity.

[Anode]

The anode 22 may include, for example, an anode current collector 22A and an anode active material layer 22B provided on both surfaces of the anode current collector 22A, as illustrated in FIG. 2. Alternatively, the anode active material layer 22B may be provided on a single surface of the anode current collector 22A.

The anode current collector 22A may be made of, for example, one or more of conductive materials. The kind of the conductive material is not particularly limited, but may be, for example, a metal material such as copper (Cu), aluminum (Al), nickel (Ni), and stainless steel. The anode current collector 22A may be configured of a single layer or may be configured of multiple layers.

A surface of the anode current collector 22A may be preferably roughened. This makes it possible to improve adhesibility of the anode active material layer 22B with respect to the anode current collector 22A by a so-called anchor effect. In this case, it may be only necessary to roughen the surface of the anode current collector 22A at least in a region facing the anode active material layer 22B. Examples of a roughening method may include a method of forming fine particles with use of electrolytic treatment. Through the electrolytic treatment, fine particles are formed on the surface of the anode current collector 22A in an electrolytic bath by an electrolytic method to make the surface of the anode current collector 22A rough. A copper foil fabricated by the electrolytic method is generally called "electrolytic copper foil".

The anode active material layer 22B contains, as an anode active material, one or more of anode materials that have ability to insert and extract lithium. It is to be noted that the anode active material layer 22B may further contain one or more of other materials such as an anode binder and an anode conductor, in addition to the anode active material.

In order to prevent lithium metal from being unintentionally precipitated on the anode 22 in the middle of charge, chargeable capacity of the anode material may be preferably larger than discharge capacity of the cathode 21. In other words, electrochemical equivalent of the anode material that has ability to insert and extract lithium may be preferably larger than electrochemical equivalent of the cathode 21.

The anode material may be, for example, one or more of carbon materials. The carbon material causes an extremelysmall change in a crystal structure thereof during insertion and extraction of lithium, which stably achieves high energy density. Further, the carbon material also serves as the anode conductor, which improves conductivity of the anode active material layer 22B.

Examples of the carbon material may include graphitizable carbon, nongraphitizable carbon, and graphite. A spacing of (002) plane in the nongraphitizable carbon may be preferably 0.37 nm or larger, and a spacing of (002) plane in the graphite may be preferably 0.34 nm or smaller. More specific examples of the carbon material may include pyrolytic carbons, cokes, glassy carbon fibers, an organic polymer compound fired body, activated carbon, and carbon blacks. Examples of the cokes may include pitch coke, needle coke, and petroleum coke. The organic polymer compound fired body is a polymer compound fired (carbonized) at an appropriate temperature. Examples of the polymer compound may include phenol resin and furan resin. Other than the materials mentioned above, the carbon material may be low crystalline carbon that is subjected to heat treatment at a temperature of about 1000° C. or lower, or may be amorphous carbon. It is to be noted that a shape of the carbon material may be one or more of a fibrous shape, a spherical shape, a granular shape, and a scale-like shape.

Moreover, the anode material may be, for example, a material (a metal-based material) that contains one or more of metal elements and metalloid elements as constituent elements. This makes it possible to achieve high energy density.

The metal-based material may be any of a simple substance, an alloy, or a compound, may be two or more thereof, or may have one or more phases thereof at least in part. It is to be noted that the "alloy" also encompasses a material that contains one or more metal elements and one or more metalloid elements, in addition to a material that is configured of two or more metal elements. Further, the "alloy" may contain one or more of nonmetallic elements. Examples of a structure of the metal-based material may include a solid solution, a eutectic crystal (a eutectic mixture), an intermetallic compound, and a structure in which two or more thereof coexist.

The metal elements and the metalloid elements mentioned above may be, for example, one or more of metal elements and metalloid elements that are able to form an alloy with lithium. Specific examples thereof may include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc, hafnium (Hf), zirconium, yttrium (Y), palladium (Pd), and platinum (Pt).

In particular, silicon, tin, or both may be preferable. Silicon and tin have superior ability to insert and extract lithium, and achieve remarkably high energy density accordingly.

A material that contains silicon, tin, or both as constituent elements may be any of a simple substance, an alloy, and a compound of silicon, may be any of a simple substance, an alloy, and a compound of tin, may be two or more thereof, or may be a material that has one or more phases thereof at least in part. The simple substance described here merely refers to a simple substance in a general sense (in which a small amount of impurity may be contained), and does not necessarily refer to a simple substance having a purity of 100%.

The alloy of silicon may contain, for example, one or more of elements such as tin, nickel, copper, iron, cobalt, manganese, zinc, indium, silver, titanium, germanium, bismuth, antimony, and chromium, as constituent elements other than silicon. The compound of silicon may contain, for example, one or more of elements such as carbon and oxygen, as constituent elements other than silicon. It is to be noted that the compound of silicon may contain, for example, one or more of the elements described related to the alloy of silicon, as constituent elements other than silicon.

Specific examples of the alloy of silicon and the compound of silicon may include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$), and LiSiO. It is to be noted that "v" in $SiO_v$ may be, for example, in a range of $0.2<v\leq1.4$.

The alloy of tin may contain, for example, one or more of elements such as silicon, nickel, copper, iron, cobalt, manganese, zinc, indium, silver, titanium, germanium, bismuth, antimony, and chromium, as constituent elements other than tin. The compound of tin may contain, for example, one or more of elements such as carbon and oxygen, as constituent elements other than tin. It is to be noted that the compound of tin may contain, for example, one or more of the elements described related to the alloy of tin, as constituent elements other than tin.

Specific examples of the alloy of tin and the compound of tin may include $SnO_w$ ($0<w\leq2$), $SnSiO_3$, LiSnO, and $Mg_2Sn$.

In particular, the material that contains tin (a first constituent element) as a constituent element may be preferably, for example, a material that contains, together with tin, a second constituent element and a third constituent element. The second constituent element may include, for example, one or more of elements such as cobalt, iron, magnesium, titanium, vanadium, chromium, manganese, nickel, copper, zinc, gallium, zirconium, niobium, molybdenum, silver, indium, cesium (Ce), hafnium (Hf), tantalum, tungsten, bismuth, and silicon. The third constituent element may include, for example, one or more of elements such as boron, carbon, aluminum, and phosphorus (P). The Sn-containing material containing the second constituent element and the third constituent element makes it possible to achieve, for example, high battery capacity and superior cycle characteristics.

In particular, the Sn-containing material may be preferably a material (a SnCoC-containing material) that contains tin, cobalt, and carbon as constituent elements. In the SnCoC-containing material, for example, a content of carbon may be from 9.9 mass % to 29.7 mass % both inclusive, and a ratio of contents of tin and cobalt (Co/(Sn+Co)) may be from 20 mass % to 70 mass % both inclusive. This makes it possible to achieve high energy density.

The SnCoC-containing material may preferably have a phase that contains tin, cobalt, and carbon. Such a phase may be preferably low crystalline or amorphous. This phase is a reaction phase that is able to react with lithium. Hence, existence of the reaction phase results in achievement of superior characteristics. A half width (a diffraction angle 2θ) of a diffraction peak obtained by X-ray diffraction of this reaction phase may be preferably 10 or larger in a case where a CuKα ray is used as a specific X-ray, and an insertion rate is 1°/min. This makes it possible to insert and extract lithium more smoothly, and to decrease reactivity with the electrolytic solution. It is to be noted that, in some cases, the SnCoC-containing material may include a phase that contains simple substances of the respective constituent elements or part thereof in addition to the low-crystalline phase or the amorphous phase.

Comparison between X-ray diffraction charts before and after an electrochemical reaction with lithium makes it possible to easily determine whether the diffraction peak obtained by the X-ray diffraction corresponds to the reaction phase that is able to react with lithium. For example, if a position of the diffraction peak after the electrochemical reaction with lithium is changed from the position of the diffraction peak before the electrochemical reaction with lithium, the obtained diffraction peak corresponds to the reaction phase that is able to react with lithium. In this case, for example, the diffraction peak of the low-crystalline reaction phase or the amorphous reaction phase is seen in a range of 2θ that is from 20° to 50° both inclusive. Such a reaction phase may include, for example, the respective constituent elements mentioned above, and it may be considered that such a reaction phase has become low crystalline or amorphous mainly because of existence of carbon.

In the SnCoC-containing material, part or all of carbon that is the constituent element thereof may be preferably bound to one or both of a metal element and a metalloid element that are other constituent elements thereof. Binding part or all of carbon suppresses cohesion or crystallization of, for example, tin. It is possible to confirm a binding state of the elements, for example, by X-ray photoelectron spectroscopy (XPS). In a commercially-available apparatus, for example, an Al-Kα ray or a Mg-Kα ray may be used as a soft X-ray. In a case in which part or all of carbon is bound to one or both of the metal element and the metalloid element, a peak of a synthetic wave of is orbit of carbon (C1s) appears in a region lower than 284.5 eV. It is to be noted that energy calibration is so made that a peak of 4f orbit of a gold atom (Au4f) is obtained at 84.0 eV. In this case, in general, surface contamination carbon exists on the material surface. Hence, a peak of C1s of the surface contamination carbon is regarded to be at 284.8 eV, and this peak is used as energy standard. In XPS measurement, a waveform of the peak of C1s is obtained as a form that includes the peak of the surface contamination carbon and the peak of the carbon in the SnCoC-containing material. The two peaks may be therefore separated from each other, for example, by analysis with use of commercially-available software. In the analysis of the waveform, a position of the main peak that exists on the lowest bound energy side is regarded as the energy standard (284.8 eV).

The SnCoC-containing material is not limited to a material (SnCoC) that contains only tin, cobalt, and carbon as constituent elements. The SnCoC-containing material may further contain one or more of, for example, silicon, iron, nickel, chromium, indium, niobium, germanium, titanium, molybdenum, aluminum, phosphorus, gallium, and bismuth, as constituent elements, in addition to tin, cobalt, and carbon.

Other than the SnCoC-containing material, a material (a SnCoFeC-containing material) that contains tin, cobalt, iron, and carbon as constituent elements may be also preferable. Any composition of the SnCoFeC-containing material may be adopted. To give an example, in a case where a content of iron is set smaller, a content of carbon may be from 9.9 mass % to 29.7 mass % both inclusive, a content of iron may be from 0.3 mass % to 5.9 mass % both inclusive, and a ratio of contents of tin and cobalt (Co/(Sn+Co)) may be from 30 mass % to 70 mass % both inclusive. Alternatively, in a case where the content of iron is set larger, the content of carbon may be from 11.9 mass % to 29.7 mass % both inclusive, the ratio of contents of tin, cobalt, and iron ((Co+Fe)/(Sn+Co+Fe)) may be from 26.4 mass % to 48.5 mass % both inclusive, and the ratio of contents of cobalt and iron (Co/(Co+Fe)) may be from 9.9 mass % to 79.5 mass % both inclusive. Such composition ranges allow for achievement of high energy density. It is to be noted that physical characteristics (such as a half width) of the SnCoFeC-containing material are similar to physical characteristics of the foregoing SnCoC-containing material.

Other than the materials mentioned above, the anode material may be one or more of, for example, a metal oxide and a polymer compound. Examples of the metal oxide may include iron oxide, ruthenium oxide, and molybdenum oxide. Examples of the polymer compound may include polyacetylene, polyaniline, and polypyrrole.

In particular, the anode material may preferably contain both the carbon material and the metal-based material for the following reason.

The metal-based material, in particular, the material containing one or both of silicon and tin as constituent elements has a concern that such a material is easily and radically expanded or contracted during charge and discharge, whereas such a material has an advantage of high theoretical capacity. In contrast, the carbon material has an advantage that the carbon material is less prone to be expanded or contracted during charge and discharge, whereas the carbon material has a concern of low theoretical capacity. Hence, using both of the carbon material and the metal-based material makes it possible to suppress expansion and contraction during charge and discharge while achieving high theoretical capacity (in other words, high battery capacity).

The anode active material layer 22B may be formed by, for example, one or more of a coating method, a vapor-phase method, a liquid-phase method, a spraying method, and a firing method (sintering method). The coating method may be, for example, a method in which, after a particulate (powder) anode active material is mixed with, for example, an anode binder, the mixture is dispersed in a solvent such as an organic solvent, and the resultant is applied onto the anode current collector 22A. Examples of the vapor-phase method may include a physical deposition method and a chemical deposition method. More specifically, examples thereof may include a vacuum evaporation method, a sputtering method, an ion plating method, a laser ablation method, a thermal chemical vapor deposition method, a chemical vapor deposition (CVD) method, and a plasma chemical vapor deposition method. Examples of the liquid-phase method may include an electrolytic plating method and an electroless plating method. The spraying method is a method in which an anode active material in a fused state or a semi-fused state is sprayed to the anode current collector 22A. The firing method may be, for example, a method in which, after the mixture dispersed in, for example, the solvent is applied onto the anode current collector 22A by the coating method, the resultant is subjected to heat treatment at a temperature higher than a melting point of, for example, the anode binder. For example, one or more of firing methods such as an atmosphere firing method, a reactive firing method, and a hot press firing method may be employed as the firing method.

In the secondary battery, as described above, in order to prevent lithium metal from being unintentionally precipitated on the anode 22 in the middle of charge, the electrochemical equivalent of the anode material that has ability to insert and extract lithium may be preferably larger than the electrochemical equivalent of the cathode. Moreover, in a case in which an open circuit voltage (that is, a battery voltage) in a completely-charged state is 4.25 V or higher, an extraction amount of lithium per unit mass is larger than that in a case in which the open circuit voltage is 4.20 V, even if the same cathode active material is used. Hence, amounts of the cathode active material and the anode active material are adjusted in accordance therewith. As a result, high energy density is achieved.

[Separator]

For example, the separator 23 may be provided between the cathode 21 and the anode 22, as illustrated in FIG. 2. The separator 23 separates the cathode 21 from the anode 22, and passes lithium ions therethrough while preventing current short circuit that results from contact between the cathode 21 and the anode 22.

The separator 23 may be, for example, one or more of porous films such as porous films of a synthetic resin and ceramics. The separator 23 may be a laminated film in which two or more porous films are laminated. Examples of the synthetic resin may include polytetrafluoroethylene, polypropylene, and polyethylene.

In particular, the separator 23 may include, for example, the foregoing porous film (a base layer) and a polymer compound layer provided on a single surface or both surfaces of the base layer. This makes it possible to improve adhesibility of the separator 23 with respect to each of the cathode 21 and the anode 22, thereby suppressing deformation of the spirally wound electrode body 20. This makes it possible to suppress decomposition reaction of the electrolytic solution and to suppress liquid leakage of the electrolytic solution with which the base layer is impregnated. Accordingly, even if charge and discharge are repeated, resistance is less prone to increase, and battery swollenness is suppressed.

The polymer compound layer may contain, for example, a polymer material such as polyvinylidene fluoride, which has high physical strength and is electrochemically stable. The polymer material may be any material other than polyvinylidene fluoride. In order to form the polymer compound layer, for example, the base layer may be coated with a solution prepared by dissolving the polymer material in, for example, an organic solvent, and thereafter, the base layer may be dried. Alternatively, the base layer may be immersed in the solution, and thereafter the base layer may be dried.

[Electrolytic Solution]

The electrolytic solution may contain, for example, one or more of solvents and one or more of electrolytic salts. It is to be noted that the electrolytic solution may further contain one or more of other materials such as an additive.

The solvent may include one or more of solvents such as a nonaqueous solvent (an organic solvent). An electrolytic solution containing the nonaqueous solvent is a so-called nonaqueous electrolytic solution.

Examples of the solvent may include a cyclic carbonate ester, a chain carbonate ester, a lactone, a chain carboxylate ester, and a nitrile (mononitrile), which make it possible to achieve, for example, high battery capacity, superior cycle characteristics, and superior storage characteristics.

Specific examples of the cyclic carbonate ester may include ethylene carbonate, propylene carbonate, and butylene carbonate. Specific examples of the chain carbonate ester may include dimethyl carbonate, diethyl carbonate, ethyl methyl carbonate, and methylpropyl carbonate. Specific examples of the lactone may include γ-butyrolactone and γ-valerolactone. Specific examples of the chain carboxylate ester may include methyl acetate, ethyl acetate, methyl propionate, ethyl propionate, propyl propionate, methyl butyrate, methyl isobutyrate, methyl trimethylacetate, and ethyl trimethylacetate. Specific examples of the nitrile may include acetonitrile, methoxyacetonitrile, and 3-methoxypropionitrile.

Other than the materials mentioned above, examples of the solvent may include 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, N,N-dimethylformamide, N-methylpyrrolidinone, N-methyloxazolidinone, N,N'-dimethylimidazolidinone, nitromethane, nitroethane, sulfolane, trimethyl phosphate, and dimethylsulfoxide. These solvents make it possible to achieve similar advantages.

In particular, one or more of ethylene carbonate, propylene carbonate, dimethyl carbonate, diethyl carbonate, and ethyl methyl carbonate may be preferable. These materials make it possible to achieve, for example, high battery capacity, superior cycle characteristics, and superior storage characteristics. In this case, a combination of a high-viscosity (high dielectric constant) solvent (having, for example, specific dielectric constant $\varepsilon \geq 30$) such as ethylene carbonate and propylene carbonate and a low-viscosity solvent (having, for example, viscosity$\leq 1$ mPa·s) such as dimethyl carbonate, ethylmethyl carbonate, and diethyl carbonate may be more preferable. The combination allows for an improvement in the dissociation property of the electrolyte salt and ion mobility.

In particular, the solvents may include an unsaturated cyclic carbonate ester, a halogenated carbonate ester, a sulfonate ester, an acid anhydride, a dicyano compound (dinitrile), and a diisocyanate compound, which make it possible to further improve chemical stability of the electrolytic solution.

The unsaturated cyclic carbonate ester is a cyclic carbonate ester having one or more unsaturated bonds (carbon-carbon double bonds). Specific examples of the unsaturated cyclic carbonate ester may include vinylene carbonate (1,3-dioxol-2-one), vinyl ethylene carbonate (4-vinyl-1,3-dioxolane-2-one), and methylene ethylene carbonate (4-methylene-1,3-dioxolane-2-one). In addition thereto, specific examples of the unsaturated cyclic carbonate ester may include catechol carbonate having a benzene ring. A content of the unsaturated cyclic carbonate ester in the solvent is not particularly limited, but may be, for example, from 0.01 wt % to 10 wt % both inclusive.

The halogenated carbonate ester is a cyclic or chain carbonate ester containing one or more halogens as constituent elements. Specific examples of the halogenated carbonate ester may include 4-fluoro-1,3-dioxolane-2-one, 4,5-difluoro-1,3-dioxolane-2-one, fluoromethyl methyl carbonate, bis(fluoromethyl) carbonate, and difluoromethyl methyl carbonate. A content of the halogenated carbonate ester in the solvent is not particularly limited, but may be, for example, from 0.01 wt % to 50 wt % both inclusive.

Specific examples of the sulfonate ester may include sultone such as 1,3-propane sultone and 1,3-propene sultone. A content of the sulfonate ester in the solvent is not particularly limited, but may be, for example, from 0.5 wt % to 5 wt % both inclusive.

Examples of the acid anhydride may include a carboxylic anhydride, a disulfonic anhydride, and a carboxylic-sulfonic anhydride. Specific examples of the carboxylic anhydride may include succinic anhydride, glutaric anhydride, and maleic anhydride. Specific examples of the disulfonic anhydride may include ethanedisulfonic anhydride and propanedisulfonic anhydride. Specific examples of the carboxylic-sulfonic anhydride may include sulfobenzoic anhydride, sulfopropionic anhydride, and sulfobutyric anhydride. A content of the acid anhydride in the solvent is not particularly limited, but may be, for example, from 0.5 wt % to 5 wt % both inclusive.

Specific examples of the dicyano compound may include succinonitrile (NC—$C_2H_4$—CN), glutaronitrile (NC—$C_3H_6$—CN), adiponitrile (NC—$C_4H_8$—CN), and phthalonitrile (NC—$C_6H_5$—CN). A content of the dicyano compound in the solvent is not particularly limited, but may be, for example, from 0.5 wt % to 5 wt % both inclusive.

Specific examples of the diisocyanate compound may include OCN—$C_6H_{12}$—NCO. A content of the diisocyanate compound in the solvent is not particularly limited, but may be, for example, from 0.5 wt % to 5 wt % both inclusive.

Examples of the electrolyte salt may include one or more of lithium salts. However, the electrolyte salt may contain a salt other than the lithium salt. Examples of the salt other than lithium may include a salt of a light metal other than lithium.

Examples of the lithium salt may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenylborate ($LiB(C_6H_5)_4$), lithium methanesulfonate ($LiCH_3SO_3$), lithium trifluoromethane sulfonate ($LiCF_3SO_3$), lithium tetrachloroaluminate ($LiAlCl_4$), dilithium hexafluorosilicate ($Li_2SiF_6$), lihtium chloride (LiCl), lithium bromide (LiBr), and lithium bis(fluorosulfonyl)imide ($LiN(SO_2F)_2$).

In particular, one or more of lithium hexafluorophosphate, lithium tetrafluoroborate, lithium perchlorate, and lithium hexafluoroarsenate may be preferable, and lithium hexafluorophosphate may be more preferable. These lithium salts make it possible to decrease the internal resistance.

A content of the electrolyte salt is not particularly limited. However, in particular, the content of the electrolyte salt may be preferably from 0.3 mol/kg to 3.0 mol/kg both inclusive with respect to the solvent, which makes it possible to achieve high ionic conductivity.

The additive may include, for example, one or more of phosphorus-fluorine-containing salts such as lithium difluorophosphate ($LiPF_2O_2$) and lithium fluorophosphate ($Li_2PFO_3$). A content of the phosphorus-fluorine-containing salt in the electrolytic solution is not particularly limited.

[Operation of Secondary Battery]

The secondary battery may operate as follows, for example.

When the secondary battery is charged, lithium ions are extracted from the cathode 21 and the extracted lithium ions are inserted in the anode 22 through the electrolytic solution. In contrast, when the secondary battery is discharged, lithium ions are extracted from the anode 22 and the extracted lithium ions are inserted in the cathode 21 through the electrolytic solution.

[Method of Manufacturing Secondary Battery]

The secondary battery may be manufactured by the following procedure, for example.

When fabricating the cathode 21, first, the cathode active material containing the foregoing active material of the present technology, and, on as-necessary basis, for example, the cathode binder and the cathode conductor may be mixed to obtain a cathode mixture. Subsequently, the cathode mixture may be dispersed in, for example, an organic solvent to obtain paste cathode mixture slurry. Next, both surfaces of the cathode current collector 21A may be coated with the cathode mixture slurry, and thereafter, the coated cathode mixture slurry may be dried to form the cathode active material layer 21B. Thereafter, the cathode active material layer 21B may be compression-molded with use of, for example, a roll pressing machine, while being heated on as-necessary basis. In this case, the cathode active material layer 21B may be compression-molded a plurality of times.

When fabricating the anode 22, the anode active material layer 22B may be formed on the anode current collector 22A by a procedure similar to the foregoing procedure of fabricating the cathode 21. More specifically, the anode active material, and, on as-necessary basis, for example, the anode-cathode binder and the anode conductor may be mixed to obtain an anode mixture. Subsequently, the anode mixture may be dispersed in, for example, an organic solvent to obtain paste anode mixture slurry. Next, both surfaces of the anode current collector 22A may be coated with the anode mixture slurry, and thereafter, the coated anode mixture slurry may be dried to form the anode active material layer 22B. Lastly, the anode active material layer 22B may be compression-molded with use of, for example, a roll pressing machine.

When preparing the electrolytic solution, the electrolyte salt may be dissolved in a solvent.

When assembling the secondary battery, the cathode lead 25 may be attached to the cathode current collector 21A by, for example, a welding method, and the anode lead 26 may be attached to the anode current collector 22A by, for example, a welding method. Subsequently, the cathode 21 and the anode 22 may be stacked with the separator 23 in between. Next, the cathode 21, the anode 22, and the separator 23 may be spirally wound to form the spirally wound electrode body 20. Thereafter, the center pin 24 may be inserted in the center of the spirally wound electrode body 20.

Subsequently, the spirally wound electrode body 20 may be sandwiched between the pair of insulating plates 12 and 13, and may be contained inside the battery can 11. In this case, an end tip of the cathode lead 25 may be attached to the safety valve mechanism 15 by, for example, a welding method, and an end tip of the anode lead 26 may be attached to the battery can 11 by, for example, a welding method. Subsequently, the electrolytic solution may be injected inside the battery can 11, and the spirally wound electrode body 20 may be impregnated with the injected electrolytic solution. Lastly, the battery cover 14, the safety valve mechanism 15, and the PTC device 16 may be swaged with the gasket 17 at the open end of the battery can 11. Thus, the cylindrical type secondary battery is completed.

[Action and Effects of Secondary Battery]

According to the secondary battery, the cathode 21 contains the active material of the present technology as the cathode active material. Hence, thermal stability is improved after repeating charge and discharge, as described above. More specifically, after repeating charge and discharge, deterioration in the cathode 21 is induced, and precipitation of lithium metal is suppressed in the anode 22. Accordingly, the temperature of the secondary battery is less prone to be excessively increased at the time of occurrence of an abnormality (at the time of heating) after repeating charge and discharge. This makes it possible to achieve high resistance at the time of occurrence of an abnormality, thereby achieving superior battery characteristics. Action and effects other than those described above are similar to those of the active material of the present technology.

<2-2. Lithium-Ion Secondary Battery (Laminated Film Type)>

FIG. 3 illustrates a perspective configuration of another secondary battery, and FIG. 4 illustrates a cross-section taken along a line IV-IV of a spirally wound electrode body 30 illustrated in FIG. 3. It is to be noted that FIG. 3 illustrates a state in which the spirally wound electrode body 30 and an outer package member 40 are separated from each other.

In the following description, the components of the cylindrical type secondary battery that have been already described are used where appropriate.

[Whole Configuration of Secondary Battery]

The secondary battery may be a lithium-ion secondary battery having a so-called laminated film type battery configuration. In the secondary battery, for example, the spirally wound electrode body 30 as a battery element may be contained inside the film-like outer package member 40, as illustrated in FIG. 3. In the spirally wound electrode body 30, for example, a cathode 33 and an anode 34 may be stacked with a separator 35 and an electrolyte layer 36 in between, and the cathode 33, the anode 34, the separator 35, and the electrolyte layer 36 may be spirally wound. A cathode lead 31 may be attached to the cathode 33, and an anode lead 32 may be attached to the anode 34. An outermost periphery of the spirally wound electrode body 30 may be protected by a protective tape 37.

Each of the cathode lead 31 and the anode lead 32 may be led out from inside to outside of the outer package member 40 in a same direction, for example. The cathode lead 31 may be made of, for example, one or more of conductive materials such as aluminum (Al). The anode lead 32 may be made of, for example, one or more of conductive materials such as copper (Cu), nickel (Ni), and stainless steel. These conductive materials may have, for example, a thin-plate shape or a mesh shape.

The outer package member 40 may be, for example, one film that is foldable in a direction of an arrow R illustrated in FIG. 3, and the outer package member 40 may have a depression for containing of the spirally wound electrode body 30 in part thereof. The outer package member 40 may be a laminated film in which a fusion bonding layer, a metal layer, and a surface protective layer are laminated in this order, for example. In a process of manufacturing the secondary battery, the outer package member 40 may be folded so that portions of the fusion-bonding layer face each other with the spirally wound electrode body 30 in between, and thereafter outer edges of the portions of the fusion bonding layer may be fusion-bonded. Alternatively, two laminated films bonded to each other by, for example, an adhesive may form the outer package member 40. Examples of the fusion bonding layer may include a film made of one or more of polyethylene, polypropylene, and other materials. The metal layer may include, for example, one or more of an aluminum foil and other metal materials. The surface protective layer may be, for example, a film made of one or more of nylon, polyethylene terephthalate, and other materials.

In particular, the outer package member 40 may be preferably an aluminum laminated film in which a polyethylene film, an aluminum foil, and a nylon film are laminated in this order. However, the outer package member 40 may be a laminated film having any other laminated structure, a polymer film such as polypropylene, or a metal film.

For example, an adhesive film 41 for prevention of outside air intrusion may be inserted between the outer package member 40 and the cathode lead 31. Moreover, for example, the foregoing adhesive film 41 may be inserted between the outer package member 40 and the anode lead 32. The adhesive film 41 may be made of a material having adhesibility with respect to the cathode lead 31 and the anode lead 32. Examples of the material having adhesibility may include a polyolefin resin. More specific examples thereof may include one or more of polyethylene, polypropylene, modified polyethylene, and modified polypropylene.

[Cathode, Anode, and Separator]

The cathode 33 may include, for example, a cathode current collector 33A and a cathode active material layer 33B, and the anode 34 may include, for example, an anode current collector 34A and an anode active material layer 34B. The configurations of the cathode current collector 33A, the cathode active material layer 33B, the anode current collector 34A, and the anode active material layer 34B may be similar to, for example, the configurations of the cathode current collector 21A, the cathode active material layer 21B, the anode current collector 22A, and the anode active material layer 22B, respectively. In other words, the cathode 33 may contain one or more of the foregoing active materials of the present technology as the cathode active material. The configuration of the separator 35 may be similar to, for example, the configuration of the separator 23.

The electrolyte layer 36 may include an electrolytic solution and a polymer compound. The configuration of the electrolytic solution may be similar to, for example, the configuration of the electrolytic solution in the cylindrical type secondary battery. The electrolyte layer 36 described here may be a so-called gel electrolyte, and the electrolytic solution may be held by the polymer compound. The gel electrolyte achieves high ionic conductivity (for example, 1 mS/cm or more at room temperature), and prevents liquid leakage of the electrolytic solution. It is to be noted that the electrolyte layer 36 may further include one or more of other materials such as an additive.

The polymer material may contain, for example, one or more of polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acid, polymethacrylic acid, styrene-butadiene rubber, nitrile-butadiene rubber, polystyrene, and polycarbonate. In addition thereto, the polymer material may be a copolymer. The copolymer may be, for example, a copolymer of vinylidene fluoride and hexafluoropropylene. In particular, polyvinylidene fluoride may be preferable as a homopolymer, and a copolymer of vinylidene fluoride and hexafluoropropylene may be preferable as a copolymer. Such polymer compounds are electrochemically stable.

In the electrolyte layer 36 that is a gel electrolyte, the solvent contained in the electrolytic solution refers to a wide concept that encompasses not only a liquid material but also a material having ionic conductivity that has ability to dissociate the electrolyte salt. Hence, in a case in which a polymer compound having ionic conductivity is used, the polymer compound is also encompassed by the solvent.

It is to be noted that the electrolytic solution may be used as it is instead of the gel electrolyte layer 36. In this case, the spirally wound electrode body 30 is impregnated with the electrolytic solution.

[Operation of Secondary Battery]

The secondary battery may operate, for example, as follows.

When the secondary battery is charged, lithium ions are extracted from the cathode 33, and the extracted lithium ions are inserted in the anode 34 through the electrolyte layer 36. In contrast, when the secondary battery is discharged, lithium ions are extracted from the anode 34, and the extracted lithium ions are inserted in the cathode 33 through the electrolyte layer 36.

[Method of Manufacturing Secondary Battery]

The secondary battery including the gel electrolyte layer 36 may be manufactured, for example, by one of the following three procedures.

In a first procedure, the cathode 33 and the anode 34 may be fabricated by a fabrication procedure similar to that of the cathode 21 and the anode 22. More specifically, the cathode 33 may be fabricated by forming the cathode active material layer 33B on both surfaces of the cathode current collector 33A, and the anode 34 may be fabricated by forming the anode active material layer 34B on both surfaces of the anode current collector 34A. Subsequently, for example, the electrolytic solution, the polymer compound, and an organic solvent may be mixed to prepare a precursor solution. Subsequently, each of the cathode 33 and the anode 34 may be coated with the precursor solution, and the coated precursor solution may be dried to form the gel electrolyte layer 36. Subsequently, the cathode lead 31 may be attached to the cathode current collector 33A by, for example, a welding method, and the anode lead 32 may be attached to the anode current collector 34A by, for example, a welding method. Subsequently, the cathode 33 and the anode 34 may be stacked with the separator 35 in between, and thereafter, the cathode 33, the anode 34, and the separator 35 may be spirally wound to fabricate the spirally wound electrode body 30. Thereafter, the protective tape 37 may be attached onto the outermost periphery of the spirally wound body 30. Subsequently, the outer package member 40 may be folded to interpose the spirally wound electrode body 30, and thereafter, the outer edges of the outer package member 40 may be bonded by, for example, a thermal fusion bonding method to enclose the spirally wound electrode body 30 in the outer package member 40. In this case, the adhesive film 41 may be inserted between the cathode lead 31 and the outer package member 40, and the adhesive film 41 may be inserted between the anode lead 32 and the outer package member 40.

In a second procedure, the cathode lead 31 may be attached to the cathode 33, and the anode lead 32 may be attached to the anode 34. Subsequently, the cathode 33 and the anode 34 may be stacked with the separator 35 in between and may be spirally wound to fabricate a spirally wound body as a precursor of the spirally wound electrode body 30. Thereafter, the protective tape 37 may be adhered to the outermost periphery of the spirally wound body. Subsequently, the outer package member 40 may be folded to interpose the spirally wound electrode body 30, and thereafter, the outer edges other than one side of the outer package member 40 may be bonded by, for example, a thermal fusion bonding method, and the spirally wound body may be contained inside a pouch formed of the outer package member 40. Subsequently, the electrolytic solution, monomers that are raw materials of the polymer compound, a polymerization initiator, and, on as-necessary basis, other materials such as a polymerization inhibitor may be mixed to prepare a composition for electrolyte. Subsequently, the composition for electrolyte may be injected inside the pouch formed of the outer package member 40. Thereafter, the pouch formed of the outer package member 40 may be hermetically sealed by, for example, a thermal fusion bonding method. Subsequently, the monomers may be thermally polymerized to form the polymer compound. Thus, the electrolytic solution may be held by the polymer compound to form the gel electrolyte layer 36.

In a third procedure, the spirally wound body may be fabricated, and then contained inside the pouch formed of the outer package member 40 in a manner similar to that of the second procedure described above, except that the separator 35 provided with the polymer compound layer is used. Subsequently, the electrolytic solution may be prepared, and then injected inside the pouch formed of the outer package member 40. Thereafter, an opening of the pouch formed of the outer package member 40 may be hermetically sealed by, for example, a thermal fusion bonding method. Subsequently, the resultant may be heated while a weight is applied to the outer package member 40 to cause the separator 35 to be closely attached to the cathode 33 with the polymer compound layer in between and to be closely attached to the anode 34 with the polymer compound layer in between. Thus, each of the polymer compound layers may be impregnated with the electrolytic solution, and each of the polymer compound layers may be gelated. Thus, the electrolyte layer 36 may be formed.

In the third procedure, swollenness of the secondary battery is suppressed more than in the first procedure. Further, in the third procedure, for example, the nonaqueous solvent and the monomers (the raw materials of the polymer compound) are hardly left in the electrolyte layer 36, as compared with the second procedure. Accordingly, the formation process of the polymer compound is favorably controlled. As a result, each of the cathode 33, the anode 34, and the separator 35 is sufficiently and closely attached to the electrolyte layer 36.

[Action and Effects of Secondary Battery]

According to the secondary battery, the cathode 33 contains the active material of the present technology as the cathode active material. Therefore, superior battery characteristics are achievable for a reason similar to the reason in the cylindrical type secondary battery. Action and effects other than those described above are similar to those of the cylindrical type secondary battery.

<2-3. Lithium Metal Secondary Battery>

A secondary battery described here is a cylindrical type secondary battery (lithium metal secondary battery) in which the capacity of the anode 22 is obtained by precipitation and dissolution of lithium metal. The secondary battery has a configuration similar to that of the foregoing lithium-ion secondary battery (cylindrical type), and is manufactured by a similar procedure, except that the anode active material layer 22B is made of the lithium metal.

In the secondary battery, the lithium metal is used as an anode active material, and high energy density is thereby achievable. The anode active material layer 22B may exist at the time of assembling, or the anode active material layer 22B may not necessarily exist at the time of assembling and may be made of the lithium metal precipitated during charge. Further, the anode active material layer 22B may be used as a current collector, and the anode current collector 22A may be omitted.

The secondary battery may operate, for example, as follows. When the secondary battery is charged, lithium ions are extracted from the cathode 21, and the extracted lithium ions are precipitated as the lithium metal on the surface of the anode current collector 22A through the electrolytic solution. In contrast, when the secondary battery is discharged, the lithium metal is eluded as lithium ions from the anode active material layer 22B, and is inserted in the cathode 21 through the electrolytic solution.

According to the cylindrical type lithium metal secondary battery, the cathode 21 contains the active material of the present technology as the cathode active material. Therefore, superior battery characteristics are achievable for a reason similar to the reason in the foregoing lithium-ion secondary battery.

It is to be noted that the lithium metal secondary battery described here is not limited to the cylindrical type secondary battery, and may be a laminated film type secondary battery. Even in this case, similar effects are achievable.

<3. Applications of Secondary Battery>

Next, description is given of application examples of any of the secondary batteries mentioned above.

Applications of the secondary battery are not particularly limited as long as the secondary battery is applied to, for example, a machine, a device, an instrument, an apparatus, and a system (a collective entity of, for example, a plurality of devices) that are able to use the secondary battery as a driving power source, an electric power storage source for electric power accumulation, or any other source. The secondary battery used as the power source may be a main power source (a power source used preferentially), or may be an auxiliary power source (a power source used instead of the main power source or used being switched from the main power source). In a case in which the secondary battery is used as the auxiliary power source, the kind of the main power source is not limited to the secondary battery.

Examples of the applications of the secondary battery may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a battery pack used as an attachable and detachable power source of, for example, a notebook personal computer; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the secondary battery may be employed for an application other than the applications mentioned above.

In particular, the secondary battery may be effectively applicable to, for example, the battery pack, the electric vehicle, the electric power storage system, the electric power tool, and the electronic apparatus. In these applications, superior battery characteristics are demanded, and using the secondary battery of the present technology makes it possible to effectively improve performance. It is to be noted that the battery pack is a power source that uses the secondary battery, and may be, for example, an assembled battery. The electric vehicle is a vehicle that operates (runs) using the secondary battery as a driving power source, and may be an automobile (such as a hybrid automobile) that includes together a drive source other than the secondary battery, as described above. The electric power storage system is a system that uses the secondary battery as an electric power storage source. For example, in a home electric power storage system, electric power is accumulated in the secondary battery that is the electric power storage source, which makes it possible to use, for example, home electric products with use of the accumulated electric power. The electric power tool is a tool in which a movable section (such as a drill) is allowed to be moved with use of the secondary battery as a driving power source. The electronic apparatus is an apparatus that executes various functions with use of the secondary battery as a driving power source (an electric power supply source).

Hereinafter, specific description is given of some application examples of the secondary battery. It is to be noted that configurations of the respective application examples described below are mere examples, and may be changed as appropriate.

<3-1. Battery Pack (Single Battery)>

FIG. 5 illustrates a perspective configuration of a battery pack using a single battery. FIG. 6 illustrates a block configuration of the battery pack illustrated in FIG. 5. It is to be noted that FIG. 5 illustrates the battery back in an exploded state.

The battery back described here is a simple battery pack using one secondary battery (a so-called soft pack), and may be mounted in, for example, an electronic apparatus typified by a smartphone. For example, the battery pack may include a power source 111 that is the laminated film type secondary battery, and a circuit board 116 coupled to the power source 111, as illustrated in FIG. 5. A cathode lead 112 and an anode lead 113 may be attached to the power source 111.

A pair of adhesive tapes 118 and 119 may be adhered to both side surfaces of the power source 111. A protection circuit module (PCM) may be formed in the circuit board 116. The circuit board 116 may be coupled to the cathode 112 through a tab 114, and be coupled to the anode lead 113 through a tab 115. Moreover, the circuit board 116 may be coupled to a lead 117 provided with a connector for external connection. It is to be noted that while the circuit board 116 is coupled to the power source 111, the circuit board 116 may be protected from upper side and lower side by a label 120 and an insulating sheet 121. The label 120 may be adhered to fix, for example, the circuit board 116 and the insulating sheet 121.

Moreover, for example, the battery pack may include the power source 111 and the circuit board 116 as illustrated in FIG. 6. The circuit board 116 may include, for example, a controller 121, a switch section 122, a PTC 123, and a temperature detector 124. The power source 111 is connectable to outside through a cathode terminal 125 and an anode terminal 127, and is thereby charged and discharged through the cathode terminal 125 and the anode terminal 127. The temperature detector 124 is allowed to detect a temperature with use of a temperature detection terminal (a so-called T terminal) 126.

The controller 121 controls an operation of the entire battery pack (including a used state of the power source 111), and may include, for example, a central processing unit (CPU) and a memory.

For example, in a case in which a battery voltage reaches an overcharge detection voltage, the controller 121 may so cause the switch section 122 to be disconnected that a charge current does not flow into a current path of the power source 111. Moreover, for example, in a case in which a large current flows during charge, the controller 121 may cause the switch section 122 to be disconnected, thereby blocking the charge current.

In addition, for example, in a case in which the battery voltage reaches an overdischarge detection voltage, the controller 121 may so cause the switch section 122 to be disconnected that a discharge current does not flow into the current path of the power source 111. Moreover, for example, in a case in which a large current flows during discharge, the controller 121 may cause the switch section 122 to be disconnected, thereby blocking the discharge current.

It is to be noted that the overcharge detection voltage of the secondary battery may be, for example, 4.20 V±0.05 V, and the overdischarge detection voltage may be, for example, 2.4 V±0.1 V.

The switch section 122 switches the used state of the power source 111 (whether the power source 111 is connectable to an external device) in accordance with an instruction from the controller 121. The switch section 122 may include, for example, a charge control switch and a discharge control switch. The charge control switch and the discharge control switch each may be, for example, a semiconductor switch such as a field-effect transistor using a metal oxide semiconductor (MOSFET). It is to be noted that the charge current and the discharge current may be detected on the basis of on-resistance of the switch section 122.

The temperature detector 124 measures a temperature of the power source 111, and outputs a result of the measurement to the controller 121. The temperature detector 124 may include, for example, a temperature detecting element such as a thermistor. It is to be noted that the result of the measurement by the temperature detector 124 may be used, for example, in a case in which the controller 121 performs charge and discharge control at the time of abnormal heat generation and in a case in which the controller 121 performs a correction process at the time of calculating remaining capacity.

It is to be noted that the circuit board 116 may not include the PTC 123. In this case, a PTC element may be separately attached to the circuit board 116.

<3-2. Battery Pack (Assembled Battery)>

FIG. 7 illustrates a block configuration of a battery pack using an assembled battery. For example, the battery pack may include a controller 61, a power source 62, a switch section 63, a current measurement section 64, a temperature detector 65, a voltage detector 66, a switch controller 67, a memory 68, a temperature detecting element 69, a current detection resistance 70, a cathode terminal 71, and an anode terminal 72 inside a housing 60. The housing 60 may be made of, for example, a plastic material.

The controller 61 controls an operation of the entire battery pack (including a used state of the power source 62), and may include, for example, a CPU. The power source 62 includes one or more secondary batteries. The power source 62 may be, for example, an assembled battery that includes two or more secondary batteries. The secondary batteries may be connected in series, in parallel, or in series-parallel combination. To give an example, the power source 62 may include six secondary batteries in which two sets of series-connected three batteries are connected in parallel to each other.

The switch section 63 switches the used state of the power source 62 (whether the power source 62 is connectable to an external device) in accordance with an instruction from the controller 61. The switch section 63 may include, for example, a charge control switch, a discharge control switch, a charging diode, and a discharging diode. The charge control switch and the discharge control switch each may be, for example, a semiconductor switch such as a field-effect transistor that uses a metal oxide semiconductor (a MOSFET).

The current measurement section 64 measures a current with use of the current detection resistance 70, and outputs a result of the measurement to the controller 61. The temperature detector 65 measures a temperature with use of the temperature detecting element 69, and outputs a result of the measurement to the controller 61. The result of the temperature measurement may be used, for example, in a case in which the controller 61 performs charge and discharge control at the time of abnormal heat generation and in a case in which the controller 61 performs a correction process at the time of calculating remaining capacity. The voltage detector 66 measures voltages of the secondary batteries in the power source 62, performs analog-to-digital conversion on the measured voltage, and supplies the resultant to the controller 61.

The switch controller 67 controls an operation of the switch section 63 in accordance with signals inputted from the current measurement section 64 and the voltage detector 66.

For example, in a case in which a battery voltage reaches an overcharge detection voltage, the switch controller 67 may so cause the switch section 63 (the charge control switch) to be disconnected that a charge current does not flow into a current path of the power source 62. This makes it possible to perform only discharge through the discharging diode in the power source 62. It is to be noted that, for example, when a large current flows during charge, the switch controller 67 may block the charge current.

Further, for example, in a case in which the battery voltage reaches an overdischarge detection voltage, the switch controller 67 may so cause the switch section 63 (the discharge control switch) to be disconnected that a discharge current does not flow into the current path of the power source 62. This makes it possible to perform only discharge through the charging diode in the power source 62. It is to be noted that, for example, when a large current flows during discharge, the switch controller 67 may block the discharge current.

It is to be noted that the overcharge detection voltage of the secondary battery may be, for example, 4.20 V±0.05 V, and the overdischarge detection voltage may be, for example, 2.4 V±0.1 V.

The memory 68 may be, for example, an EEPROM that is a non-volatile memory. The memory 68 may hold, for example, numerical values calculated by the controller 61 and information of the secondary battery measured in a manufacturing process (such as internal resistance in an initial state). It is to be noted that, in a case in which the memory 68 holds full charge capacity of the secondary battery, the controller 61 is allowed to comprehend information such as remaining capacity.

The temperature detecting element 69 measures a temperature of the power source 62, and outputs a result of the measurement to the controller 61. The temperature detecting element 69 may be, for example, a thermistor.

The cathode terminal 71 and the anode terminal 72 are terminals that may be coupled to, for example, an external device (such as a notebook personal computer) driven with use of the battery pack or an external device (such as a battery charger) used for charge of the battery pack. The power source 62 is charged and discharged via the cathode terminal 71 and the anode terminal 72.

<3-3. Electric Vehicle>

FIG. 8 illustrates a block configuration of a hybrid automobile that is an example of an electric vehicle. The electric vehicle may include, for example, a controller 74, an engine 75, a power source 76, a driving motor 77, a differential 78, an electric generator 79, a transmission 80, a clutch 81, inverters 82 and 83, and various sensors 84 inside a housing 73 made of metal. Other than the components mentioned above, the electric vehicle may include, for example, a front drive shaft 85 and a front tire 86 that are coupled to the differential 78 and the transmission 80, and a rear drive shaft 87, and a rear tire 88.

The electric vehicle may be runnable with use of one of the engine 75 and the motor 77 as a drive source, for example. The engine 75 is a main power source, and may be, for example, a petrol engine. In a case in which the engine 75 is used as the power source, drive power (torque) of the engine 75 may be transferred to the front tire 86 or the rear tire 88 via the differential 78, the transmission 80, and the clutch 81 that are drive sections, for example. It is to be noted that the torque of the engine 75 may be also transferred to the electric generator 79. With use of the torque, the electric generator 79 generates alternating-current electric power. The generated alternating-current electric power is converted into direct-current electric power via the inverter 83, and the converted electric power is accumulated in the power source 76. In a case in which the motor 77 that is a conversion section is used as the power source, electric power (direct-current electric power) supplied from the power source 76 is converted into alternating-current electric power via the inverter 82, and the motor 77 is driven with use of the alternating-current electric power. Drive power (torque) obtained by converting the electric power by the motor 77 may be transferred to the front tire 86 or the rear tire 8 via the differential 78, the transmission 80, and the clutch 81 that are the drive sections, for example.

It is to be noted that, when speed of the electric vehicle is decreased by an unillustrated brake mechanism, resistance at the time of speed reduction may be transferred to the motor 77 as torque, and the motor 77 may generate alternating-current electric power by utilizing the torque. It may be preferable that this alternating-current electric power be converted into direct-current electric power via the inverter 82, and the direct-current regenerative electric power be accumulated in the power source 76.

The controller 74 controls an operation of the entire electric vehicle, and may include, for example, a CPU. The power source 76 includes one or more secondary batteries. The power source 76 may be coupled to an external power source, and the power source 76 may be allowed to accumulate electric power by receiving electric power supply from the external power source. The various sensors 84 may be used, for example, for control of the number of revolutions of the engine 75 and for control of an opening level (a throttle opening level) of an unillustrated throttle valve. The various sensors 84 may include, for example, a speed sensor, an acceleration sensor, and an engine frequency sensor.

It is to be noted that, although the description has been given of the case in which the electric vehicle is the hybrid automobile, the electric vehicle may be a vehicle (an electric automobile) that operates with use of only the power source 76 and the motor 77 and without using the engine 75.

<3-4. Electric Power Storage System>

FIG. 9 illustrates a block configuration of an electric power storage system. The electric power storage system may include, for example, a controller 90, a power source 91, a smart meter 92, and a power hub 93 inside a house 89 such as a general residence or a commercial building.

In this example, the power source 91 may be coupled to an electric device 94 provided inside the house 89 and may be allowed to be coupled to an electric vehicle 96 parked outside the house 89, for example. Further, for example, the power source 91 may be coupled to a private power generator 95 provided in the house 89 via the power hub 93, and may be allowed to be coupled to an outside concentrating electric power system 97 via the smart meter 92 and the power hub 93.

It is to be noted that the electric device 94 may include, for example, one or more home electric products. Examples of the home electric products may include a refrigerator, an air conditioner, a television, and a water heater. The private power generator 95 may include, for example, one or more of a solar power generator, a wind power generator, and other power generators. The electric vehicle 96 may include, for example, one or more of an electric automobile, an electric motorcycle, a hybrid automobile, and other electric vehicles. The concentrating electric power system 97 may include, for example, one or more of a thermal power plant, an atomic power plant, a hydraulic power plant, a wind power plant, and other power plants.

The controller 90 controls an operation of the entire electric power storage system (including a used state of the power source 91), and may include, for example, a CPU. The power source 91 includes one or more secondary batteries. The smart meter 92 may be an electric power meter that is compatible with a network and is provided in the house 89 demanding electric power, and may be communicable with an electric power supplier, for example. Accordingly, for example, while the smart meter 92 communicates with outside, the smart meter 92 controls balance between supply and demand in the house 89, which allows for effective and stable energy supply.

In the electric power storage system, for example, electric power may be accumulated in the power source 91 from the concentrating electric power system 97, that is an external power source, via the smart meter 92 and the power hub 93, and electric power may be accumulated in the power source 91 from the private power generator 95, that is an independent power source, via the power hub 93. The electric power accumulated in the power source 91 is supplied to the electric device 94 and the electric vehicle 96 in accordance with an instruction from the controller 91. This allows the electric device 94 to be operable, and allows the electric vehicle 96 to be chargeable. In other words, the electric power storage system is a system that makes it possible to accumulate and supply electric power in the house 89 with use of the power source 91.

The electric power accumulated in the power source 91 is allowed to be utilized optionally. Hence, for example, electric power may be accumulated in the power source 91 from the concentrating electric power system 97 in the middle of night when an electric rate is inexpensive, and the electric power accumulated in the power source 91 may be used during daytime hours when the electric rate is expensive.

It is to be noted that the foregoing electric power storage system may be provided for each household (each family unit), or may be provided for a plurality of households (a plurality of family units).

<3-5. Electric Power Tool>

FIG. 10 illustrates a block configuration of an electric power tool. The electric power tool may be, for example, an electric drill, and may include a controller 99 and a power source 100 inside a tool body 98 made of a plastic material, for example. A drill section 101 that is a movable section may be attached to the tool body 98 in an operable (rotatable) manner, for example.

The controller 99 controls an operation of the entire electric power tool (including a used state of the power source 100), and may include, for example, a CPU. The power source 100 includes one or more secondary batteries. The controller 99 allows electric power to be supplied from the power source 100 to the drill section 101 in accordance with an operation by an operation switch.

EXAMPLES

Examples of the present technology will be described in detail below.

Experimental Examples 1-1 to 1-12

The cylindrical type lithium-ion secondary batteries illustrated in FIGS. 1 and 2 were fabricated by the following procedure. It is to be noted that for simplification, the first lithium compound is referred to as "first Li compound", and the second lithium compound is referred to as "second Li compound".

The cathode 21 was fabricated as follows. First, 91 parts by mass of the cathode active material including the main phase and the sub-phase, 6 parts by mass of a cathode binder (polyvinylidene fluoride), and 3 part by mass of a cathode conductor (graphite) were mixed to obtain a cathode mixture. The composition of the main phase (the first Li compound), the composition of the sub-phase (the second Li compound), the ratio IP, and the average valence V are as illustrated in Table 1. It is to be noted that a method of specifying the compositions, and a method of calculating, for example, the ratio IP are as described above. Subsequently, the cathode mixture was dispersed in an organic solvent (N-methyl-2-pyrrolidone) to obtain cathode mixture slurry. Subsequently, both surfaces of the strip-shaped cathode current collector 21A (an aluminum foil having a thickness of 15 μm) were coated with the cathode mixture slurry with use of a coating apparatus, and thereafter, the cathode mixture slurry was dried to form the cathode active material layer 21B. Lastly, the cathode active material layer 21B was compression-molded with use of a roll pressing machine.

A procedure of manufacturing the cathode active material including the main phase and the sub-phase is as described below (experimental examples 1-2 to 1-10).

First, a nickel compound ($NiSO_4$) and an additional metal compound ($CoSO_4$) were mixed to obtain a mixture. In this case, a mixture ratio was adjusted so as to cause a molar ratio of nickel and cobalt to become nickel:cobalt=0.8:0.15. Subsequently, deionized water was added to the mixture to prepare a nickel-cobalt water solution. Next, ammonia water was dripped little by little into the nickel-cobalt water solution in an argon gas atmosphere. In this case, a temperature was from 40° C. to 60° C. both inclusive, and pH was from 11 to 13 both inclusive. Thus, nickel-cobalt hydroxide ($Ni_{0.8}Co_{0.15}(OH)_2$) that was a deposit was obtained.

Next, deionized water was added to nickel-cobalt hydroxide to prepare a nickel-cobalt hydroxide water solution. Subsequently, an aluminum compound ($NaAlO_2$) was added to the nickel-cobalt hydroxide water solution. In this case, a mixture ratio was adjusted so as to cause a molar ratio of aluminum and all of nickel, cobalt, and aluminum to become aluminum:(nickel+cobalt+aluminum)=0.05:1. Moreover, sulfuric acid ($H_2SO_4$) was used so as to cause pH to fall in a range from 9 to 9.5 both inclusive. In particular, all amount of the aluminum compound was added at once to the nickel-cobalt hydroxide water solution, and thereafter, the nickel-cobalt water solution was stirred. Thus, a mixture ($Ni_{0.8}Co_{0.15}Al_{0.05}(OH)_2$) of nickel-cobalt hydroxide and aluminum hydroxide was obtained as a deposited mixture.

Next, a lithium compound (LiOH) was added to the deposited mixture to obtain a lithium mixture. In this case, a mixture ratio was adjusted so as to cause a molar ratio of lithium and all of nickel, cobalt, and aluminum to become lithium:(nickel+cobalt+aluminum)=1:1. Subsequently, the lithium mixture was put into a mixer, and thereafter, the lithium mixture was granulated while being sufficiently mixed with use of the mixer in an argon gas atmosphere to obtain an active material precursor.

Lastly, the active material precursor was fired in an oxygen atmosphere to obtain the cathode active material including the main phase and the sub-phase. In this case, a firing temperature was 700° C.

When the cathode active material including the main phase and the sub-phase was manufactured, the composition of the first Li compound, i.e., the value of "e" illustrated in the formula (1) was changed by changing conditions such as time for stirring of the nickel-cobalt water solution. The value of "e" indicates an amount of a crystal defect (an oxygen atom defect) in a crystalline structure of the first Li compound.

It is to be noted that, for comparison, the first Li compound ($LiNi_{0.8}Co_{0.15}Al_{0.05}O_2$) in which a crystal defect did not occur in the crystalline structure was manufactured, and the first Li compound was used as the cathode active material (an experimental example 1). In this case, all amount of the aluminum compound was not added at once to the nickel-cobalt hydroxide water solution, and the aluminum compound was dripped little by little into the nickel-cobalt hydroxide water solution. The cathode active material included only the main phase (the first Li compound), and did not include the sub-phase (the second Li compound).

Moreover, for comparison, the first Li compound ($LiNi_{0.8}Co_{0.15}Al_{0.05}O_2$) in which a crystal defect did not occur in the crystalline structure was manufactured by the foregoing procedure, and thereafter, an additive ($LiAlO_2$ or $Li_5AlO_4$) was added to the first Li compound to obtain the cathode active material (experimental examples 1-11 and 1-12). The cathode active material was a mixture of the first Li compound and the additive. Accordingly, the cathode active material did not include the sub-phase.

The anode 22 was fabricated as follows. First, 90 parts by mass of an anode active material (artificial graphite) and 10 parts by mass of an anode binder (polyvinylidene fluoride) were mixed to obtain an anode mixture. Subsequently, the anode mixture was dispersed in an organic solvent (N-methyl-2-pyrrolidone) to obtain anode mixture slurry. Subsequently, both surfaces of the strip-shaped anode current collector 22A (an electrolytic copper foil having a thickness of 15 μm) were coated with the anode mixture slurry, and thereafter, the anode mixture slurry was dried to form the anode active material layer 22B. Lastly, the anode active material layer 22B was compression-molded with use of a roll pressing machine.

The electrolytic solution was prepared as follows. An electrolyte salt ($LiPF_6$) was dissolved in a solvent (ethylene carbonate and diethyl carbonate). In this case, a mixture ratio (weight ratio) of the solvent was ethylene carbonate: diethyl carbonate=50:50, and a content of the electrolyte salt was 1 mol/kg with respect to the solvent.

The secondary battery was assembled as follows. First, the cathode lead 25 made of aluminum was attached to the cathode current collector 21A by welding, and the anode lead 26 made of nickel was attached to the anode current collector 22A by welding. Subsequently, the cathode 21 and the anode 22 was stacked with the separator 23 (a microporous polyethylene film having a thickness of 25 μm) in between, and the resultant stacked body was spirally wound. Thereafter, a winding end portion of the resultant spirally wound body was fixed with use of an adhesive tape to fabricate the spirally wound electrode body 20. Subsequently, the center pin 24 was inserted in the center of the spirally wound electrode body 20. Subsequently, the spirally wound electrode body 20 was sandwiched between the pair of insulating plates 12 and 13, and was contained inside the battery can 11 made of nickel-plated iron. In this case, the end tip of the cathode lead 25 was attached to the safety valve mechanism 15 by welding, and the end tip of the anode lead 26 was attached to the battery can 11 by welding. Subsequently, the electrolytic solution was injected inside the battery can 11 by a decompression method, and the spirally wound electrode body 20 was impregnated with the electrolytic solution. Lastly, the battery cover 14, the safety valve mechanism 15, and the PTC device 16 were swaged with the gasket 17 at the open end of the battery can 11. Thus, the secondary battery was completed.

It is to be noted that when the secondary battery was fabricated, a thickness of the cathode active material layer 21B was adjusted to prevent lithium metal from being precipitated on the anode 22 in a completely-charged state.

When cycle characteristics and heating characteristics were examined as battery characteristics of each of the secondary batteries, results illustrated in Table 1 were obtained.

The cycle characteristics were examined as follows. First, one cycle of charge and discharge was performed on the secondary battery in an ambient temperature environment (23° C.) to stabilize a battery state of the secondary battery, and thereafter, one cycle of charge and discharge was further performed on the secondary battery in the same environment to measure discharge capacity at the second cycle. Subsequently, the secondary battery was repeatedly charged and discharged until the total number of cycles reached 100 cycles in the same temperature environment to measure discharge capacity at the 100th cycle. A capacity retention ratio (%)=(discharge capacity at the 100th cycle/discharge capacity at the second cycle)×100 was calculated from these results.

When the secondary battery was charged, charge was performed at a current of 1 C until a voltage reached 4.2 V, and thereafter, charge was further performed at the voltage of 4.2 V until the current reached 100 mA. When the secondary battery was discharged, discharge was performed at a current of 5 C until the voltage reached 2 V. It is to be noted that "1 C" refers to a current value at which the battery capacity (theoretical capacity) is completely discharged in 1 hour, and "5 C" refers to a current value at which the battery capacity is completely discharged in 0.2 hours.

The heating characteristics were examined as follows. First, to intentionally deteriorate the secondary battery, the secondary battery was repeatedly charged and discharged at a low-temperature environment (10° C.) until the capacity retention ratio reached 30%, and thereafter the secondary battery was charged again. The charge and discharge conditions were similar to those in the case of examining the cycle characteristics. Subsequently, the secondary battery kept in a charged state was stored (for one hour) in a high-temperature environment (120° C.), and thereafter, whether the secondary battery exploded was visually confirmed. In a case in which the secondary battery did not explode, an environment temperature was increased by 5° C., and the secondary battery was repeatedly stored and checked by a similar procedure. Thus, a highest value of the environment temperature (° C.) at which the secondary battery did not explode was considered as a limit temperature (° C.).

TABLE 1

| Experimental Example | Cathode Active Material | | | Capacity | | | |
| | Main Phase (First Li Compound) | Sub-Phase (Second Li Compound) | Additive | Ratio IP (%) | Average Valence V | Retention Ratio (%) | Limit Temperature (° C.) |
| --- | --- | --- | --- | --- | --- | --- | --- |
| 1-1 | $LiNi_{0.8}Co_{0.15}Al_{0.05}O_2$ | — | — | 0 | 3 | 96 | 120 |
| 1-2 | $LiNi_{0.8}Co_{0.15}Al_{0.05}O_{1.98}$ | $LiAlO_2 + Li_5AlO_4$ | — | 0.0003 | 2.96 | 95.3 | 125 |
| 1-3 | $LiNi_{0.8}Co_{0.15}Al_{0.05}O_{1.97}$ | $LiAlO_2 + Li_5AlO_4$ | — | 0.0005 | 2.94 | 94.7 | 125 |
| 1-4 | $LiNi_{0.8}Co_{0.15}Al_{0.05}O_{1.95}$ | $LiAlO_2 + Li_5AlO_4$ | — | 0.001 | 2.9 | 94 | 130 |
| 1-5 | $LiNi_{0.8}Co_{0.15}Al_{0.05}O_{1.925}$ | $LiAlO_2 + Li_5AlO_4$ | — | 0.25 | 2.85 | 93.2 | 135 |
| 1-6 | $LiNi_{0.8}Co_{0.15}Al_{0.05}O_{1.875}$ | $LiAlO_2 + Li_5AlO_4$ | — | 0.5 | 2.75 | 91.5 | 140 |
| 1-7 | $LiNi_{0.8}Co_{0.15}Al_{0.05}O_{1.8}$ | $LiAlO_2 + Li_5AlO_4$ | — | 0.75 | 2.6 | 91.5 | 145 |
| 1-8 | $LiNi_{0.8}Co_{0.15}Al_{0.05}O_{1.75}$ | $LiAlO_2 + Li_5AlO_4$ | — | 1 | 2.5 | 90 | 150 |
| 1-9 | $LiNi_{0.8}Co_{0.15}Al_{0.05}O_{1.735}$ | $LiAlO_2 + Li_5AlO_4$ | — | 1.005 | 2.47 | 88.5 | 155 |
| 1-10 | $LiNi_{0.8}Co_{0.15}Al_{0.05}O_{1.61}$ | $LiAlO_2 + Li_5AlO_4$ | — | 1.5 | 2.22 | 86.3 | 155 |
| 1-11 | $LiNi_{0.8}Co_{0.15}Al_{0.05}O_2$ | — | $LiAlO_2$ | 0.5 | 3 | 97 | 120 |
| 1-12 | $LiNi_{0.8}Co_{0.15}Al_{0.05}O_2$ | — | $Li_5AlO_4$ | 0.5 | 3 | 96.9 | 120 |

In a case in which the cathode active material included the sub-phase (the second Li compound) together with the main phase (the first Li compound) (the experimental examples 1-2 to 1-10), as compared with a case in which the cathode active material included only the main phase (the first Li compound) (the experimental example 1-1), the limit temperature was remarkably increased.

Moreover, in the case in which the cathode active material included the main phase and the sub-phase, when a condition (the value of "e" in the formula (1)) relating to the composition of the first Li compound satisfied $0<e\leq1.98$, a high capacity retention ratio was obtained. In this case, in particular, when $1.61\leq e\leq1.98$ was satisfied, a higher capacity retention ratio was obtained, and when $1.75\leq e\leq1.98$ was satisfied, a still higher capacity retention ratio was obtained.

It is to be noted that in a case in which the cathode active material contained the additive (the experimental examples 1-11 and 1-12), a high capacity retention ratio was obtained, but the limit temperature remained low.

Here, FIG. 11 illustrates an analysis result (an XRD pattern) of the cathode active material with use of an XRD method. In FIG. 11, a broken line indicates an XRD pattern of the experimental example 1-1, and a solid line indicates an XRD pattern of the experimental example 1-4.

In the case in which the crystal defect did not occur in the first Li compound (the experimental example 1-1), the cathode active material included the main phase, but did not include the sub-phase. Accordingly, in the XRD pattern, a peak P5 resulting from (003) plane of the main phase was detected, but a peak resulting from the sub-phase was not detected, as illustrated in FIG. 11 (the broken line).

In contrast, in the case in which the crystal defect occurred in the first Li compound (the experimental example 1-4), the cathode active material included the main phase and the sub-phase. Accordingly, in the XRD pattern, the peak P1 resulting from (003) plane of the main phase was detected, and peaks P2 to P4 resulting from the sub-phase were detected, as illustrated in FIG. 11 (the solid line). The peak P2 was a peak resulting from $LiAlO_2$, and the peaks P3 and P4 were peaks resulting from $Li_5AlO_4$.

Experimental Example 2-1 to 2-11 and 3-1 to 3-11

The secondary batteries were fabricated and battery characteristics of the secondary batteries were examined in a similar procedure, except that the composition of the first Li compound that was the main phase was changed, as illustrated in Tables 2 and 3.

When the cathode active material including the first Li compound illustrated in Table 2 was manufactured, an additional metal compound (MnSO4) was newly used, the mixture ratio was adjusted so as to cause a molar ratio of nickel, cobalt, and manganese to become nickel:cobalt:manganese=0.45:0.2:0.3. Moreover, when the cathode active material including the first Li compound illustrated in Table 3 was manufactured, the aluminum compound was not used, but a magnesium compound ($MnSO_4$) was newly used, and the mixture ratio was adjusted so as to cause a molar ratio of nickel, cobalt, and magnesium to become nickel:cobalt:magnesium=0.8:0.15:0.05.

TABLE 2

| Experimental Example | Cathode Active Material | | | Capacity | | | |
| | Main Phase (First Li Compound) | Sub-Phase (Second Li Compound) | Additive | Ratio IP (%) | Average Valence V | Retention Ratio (%) | Limit Temperature (° C.) |
|---|---|---|---|---|---|---|---|
| 2-1 | $LiNi_{0.45}Co_{0.2}Mn_{0.3}Al_{0.05}O_2$ | — | — | 0 | 3 | 97 | 125 |
| 2-2 | $LiNi_{0.45}Co_{0.2}Mn_{0.3}Al_{0.05}O_{1.98}$ | $LiAlO_2 + Li_5AlO_4$ | — | 0.0003 | 2.96 | 96 | 130 |
| 2-3 | $LiNi_{0.45}Co_{0.2}Mn_{0.3}Al_{0.05}O_{1.95}$ | $LiAlO_2 + Li_5AlO_4$ | — | 0.001 | 2.9 | 95 | 135 |
| 2-4 | $LiNi_{0.45}Co_{0.2}Mn_{0.3}Al_{0.05}O_{1.925}$ | $LiAlO_2 + Li_5AlO_4$ | — | 0.25 | 2.85 | 93 | 140 |
| 2-5 | $LiNi_{0.45}Co_{0.2}Mn_{0.3}Al_{0.05}O_{1.875}$ | $LiAlO_2 + Li_5AlO_4$ | — | 0.5 | 2.75 | 92.5 | 145 |
| 2-6 | $LiNi_{0.45}Co_{0.2}Mn_{0.3}Al_{0.05}O_{1.8}$ | $LiAlO_2 + Li_5AlO_4$ | — | 0.75 | 2.6 | 91.5 | 150 |
| 2-7 | $LiNi_{0.45}Co_{0.2}Mn_{0.3}Al_{0.05}O_{1.75}$ | $LiAlO_2 + Li_5AlO_4$ | — | 1 | 2.5 | 91 | 155 |
| 2-8 | $LiNi_{0.45}Co_{0.2}Mn_{0.3}Al_{0.05}O_{1.735}$ | $LiAlO_2 + Li_5AlO_4$ | — | 1.005 | 2.47 | 87.5 | 160 |
| 2-9 | $LiNi_{0.45}Co_{0.2}Mn_{0.3}Al_{0.05}O_{1.61}$ | $LiAlO_2 + Li_5AlO_4$ | — | 1.5 | 2.22 | 85.9 | 160 |
| 2-10 | $LiNi_{0.45}Co_{0.2}Mn_{0.3}Al_{0.05}O_2$ | — | $LiAlO_2$ | 0.5 | 3 | 96.8 | 120 |
| 2-11 | $LiNi_{0.45}Co_{0.2}Mn_{0.3}Al_{0.05}O_2$ | — | $Li_5AlO_4$ | 0.5 | 3 | 96.5 | 120 |

TABLE 3

| Experimental Example | Cathode Active Material | | | Capacity | | | |
| | Main Phase (First Li Compound) | Sub-Phase (Second Li Compound) | Additive | Ratio IP (%) | Average Valence V | Retention Ratio (%) | Limit Temperature (° C.) |
|---|---|---|---|---|---|---|---|
| 3-1 | $LiNi_{0.8}Co_{0.15}Mg_{0.05}O_2$ | — | — | 0 | 3 | 97.1 | 125 |
| 3-2 | $LiNi_{0.8}Co_{0.15}Mg_{0.05}O_{1.98}$ | $LiAlO_2 + Li_5AlO_4$ | — | 0.0003 | 2.96 | 95 | 130 |
| 3-3 | $LiNi_{0.8}Co_{0.15}Mg_{0.05}O_{1.95}$ | $LiAlO_2 + Li_5AlO_4$ | — | 0.001 | 2.9 | 93 | 130 |
| 3-4 | $LiNi_{0.8}Co_{0.15}Mg_{0.05}O_{1.925}$ | $LiAlO_2 + Li_5AlO_4$ | — | 0.25 | 2.85 | 92.1 | 135 |
| 3-5 | $LiNi_{0.8}Co_{0.15}Mg_{0.05}O_{1.875}$ | $LiAlO_2 + Li_5AlO_4$ | — | 0.5 | 2.75 | 91 | 140 |
| 3-6 | $LiNi_{0.8}Co_{0.15}Mg_{0.05}O_{1.8}$ | $LiAlO_2 + Li_5AlO_4$ | — | 0.75 | 2.6 | 90.4 | 145 |
| 3-7 | $LiNi_{0.8}Co_{0.15}Mg_{0.05}O_{1.75}$ | $LiAlO_2 + Li_5AlO_4$ | — | 1 | 2.5 | 90 | 150 |
| 3-8 | $LiNi_{0.8}Co_{0.15}Mg_{0.05}O_{1.735}$ | $LiAlO_2 + Li_5AlO_4$ | — | 1.005 | 2.47 | 87.3 | 155 |
| 3-9 | $LiNi_{0.8}Co_{0.15}Mg_{0.05}O_{1.61}$ | $LiAlO_2 + Li_5AlO_4$ | — | 1.5 | 2.22 | 85.1 | 155 |
| 3-10 | $LiNi_{0.8}Co_{0.15}Mg_{0.05}O_2$ | — | $LiAlO_2$ | 0.5 | 3 | 96.5 | 120 |
| 3-11 | $LiNi_{0.8}Co_{0.15}Mg_{0.05}O_2$ | — | $Li_5AlO_4$ | 0.5 | 3 | 96.4 | 120 |

Even in a case in which the composition of the first Li compound was changed, results similar to those in Table 1 were obtained. In other words, in the case in which the cathode active material included the main phase (the first Li compound) and the sub-phase (the second Li compound), the limit temperature was remarkably increased, and a high capacity retention ratio was obtained depending on the composition (the value of "e") of the first Li compound.

As can be seen from the results illustrated in Tables 1 to 3, when the cathode active material included the main phase (the first Li compound) and the sub-phase (the second Li compound), heating characteristics were improved, and in some cases, the cycle characteristics were also improved. Accordingly, superior battery characteristics were achieved in the secondary battery.

Although the present technology has been described above referring to some embodiments and examples, the present technology is not limited thereto, and may be modified in a variety of ways.

For example, the description has been given with reference to examples in which the battery structure is of the cylindrical type and the laminated film type, and the battery element has the spirally wound structure. However, the battery structure and the battery element structure are not limited thereto. The secondary battery of the present technology is similarly applicable also to a case in which other battery structure such as that of a square type, a coin type, or a button type is employed. Moreover, the secondary battery of the present technology is similarly applicable also to a case in which the battery element has other structure such as a stacked structure.

Further, a secondary battery-use electrolytic solution of the present technology may be applicable to any applications other than the secondary battery. Examples of other applications may include a capacitor.

Note that the effects described in the present specification are illustrative and non-limiting. The technology may have effects other than those described in the present specification.

It is to be noted that the present technology may have the following configurations.

(1)
A secondary battery, including:
a cathode containing a cathode active material that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements;
an anode; and
an electrolytic solution, $$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45 \leq b \leq 1$, $0 \leq c \leq 1$, $0 \leq d \leq 0.2$, $0<e \leq 1.98$, $(c+d)>0$, and $(b+c+d) \leq 1$.

(2)
The secondary battery according to (1), wherein $1.75 \leq e \leq 1.98$ is satisfied.

(3)
The secondary battery according to (1) or (2), wherein the second lithium compound contains one or both of $LiAlO_2$ and $Li_5AlO_4$.

(4)
The secondary battery according to any one of (1) to (3), wherein
one or more first peaks resulting from (003) plane of the main phase and one or more second peaks resulting from the sub-phase are detected by an X-ray diffraction method, and
a ratio IP of maximum intensity I2 of the second peak with respect to maximum intensity I1 of the first peak (IP=[I2/I1]×100) satisfies $0.001 \leq IP \leq 1$.

(5)
The secondary battery according to any one of (1) to (4), wherein an average valence V of nickel (Ni), M, and aluminum (Al) in the first lithium compound satisfies $2.5 \leq V \leq 2.9$.

(6)
The secondary battery according to any one of (1) to (5), wherein the secondary battery is a lithium-ion secondary battery.

(7)
A secondary battery-use electrode, including:
an active material including (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, $$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45 \leq b \leq 1$, $0 \leq c \leq 1$, $0 \leq d \leq 0.2$, $0<e \leq 1.98$, $(c+d)>0$, and $(b+c+d) \leq 1$.

(8)
A secondary battery-use active material, including:
(A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, $$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45 \leq b \leq 1$, $0 \leq c \leq 1$, $0 \leq d \leq 0.2$, $0<e \leq 1.98$, $(c+d)>0$, and $(b+c+d) \leq 1$.

(9)
A battery pack including:
the secondary battery according to any one of (1) to (6);
a controller that controls an operation of the secondary battery; and
a switch section that switches the operation of the secondary battery in accordance with an instruction from the controller.

(10)
An electric vehicle including:
the secondary battery according to any one of (1) to (6);
a converter that converts electric power supplied from the secondary battery into drive power;
a drive section that operates in accordance with the drive power; and
a controller that controls an operation of the secondary battery.

(11)
An electric power storage system including:
the secondary battery according to any one of (1) to (6);
one or more electric devices that are supplied with electric power from the secondary battery; and
a controller that controls the supplying of the electric power from the secondary battery to the one or more electric devices.

(12)
An electric power tool including:
the secondary battery according to any one of (1) to (6); and
a movable section that is supplied with electric power from the secondary battery.

(13)
An electronic apparatus including the secondary battery according to any one of (1) to (6) as an electric power supply source.

The present application is based on and claims priority from Japanese Patent Application No. 2014-243162 filed in the Japan Patent Office on Dec. 1, 2014, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A secondary battery, comprising:
a cathode containing a cathode active material that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak (IP=[I2/I1]×100) satisfies 0.25≤IP≤1;
an anode; and
an electrolytic solution, $$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy 0.8<a<1.2, 0.45≤b≤1, 0≤c≤1, 0≤d≤0.2, 0<e≤1.98, (c+d)>0, and (b+c+d)≤1.

2. The secondary battery according to claim 1, wherein 1.75≤e≤1.98 is satisfied.

3. The secondary battery according to claim 1, wherein the second lithium compound further contains $LiAlO_2$.

4. The secondary battery according to claim 1, wherein an average valence V of nickel (Ni), M, and aluminum (Al) in the first lithium compound satisfies 2.5≤V≤2.9.

5. The secondary battery according to claim 1, wherein the secondary battery is a lithium-ion secondary battery.

6. A secondary battery-use electrode, comprising:
an active material including (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$, $$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy 0.8<a<1.2, 0.45≤b≤1, 0≤c≤1, 0≤d≤0.2, 0<e≤1.98, (c+d)>0, and (b+c+d)≤1,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak (IP=[I2/I1]×100) satisfies 0.25≤IP≤1.

7. A secondary battery-use active material, comprising:
(A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak (IP=[I2/I1]×100) satisfies 0.25≤IP·1

$$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy 0.8<a<1.2, 0.45≤b≤1, 0≤c≤1, 0≤d≤0.2, 0<e≤1.98, (c+d)>0, and (b+c+d)≤1.

8. A battery pack comprising:
a secondary battery;
a controller that controls an operation of the secondary battery; and
a switch section that switches the operation of the secondary battery in accordance with an instruction from the controller,
the secondary battery including
a cathode containing a cathode active material that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak (IP=[I2/I1]×100) satisfies 0.25≤P≤1;
an anode; and
an electrolytic solution, $$Li_aNi_bM_cAl_dO_e \quad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45\leq b\leq 1$, $0\leq c\leq 1$, $0\leq d\leq 0.2$, $0<e\leq 1.98$, $(c+d)>0$, and $(b+c+d)\leq 1$.

9. An electric vehicle comprising:
a secondary battery;
a converter that converts electric power supplied from the secondary battery into drive power;
a drive section that operates in accordance with the drive power; and
a controller that controls an operation of the secondary battery,
the secondary battery including
a cathode containing a cathode active material that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak ($IP=[I2/I1]\times 100$) satisfies $0.25\leq IP\cdot 1$;
an anode; and
an electrolytic solution, $$Li_aNi_bM_cAl_dO_e \qquad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45\leq b\leq 1$, $0\leq c\leq 1$, $0\leq d\leq 0.2$, $0<e\leq 1.98$, $(c+d)>0$, and $(b+c+d)\leq 1$.

10. An electric power storage system comprising:
a secondary battery;
one or more electric devices that are supplied with electric power from the secondary battery; and
a controller that controls the supplying of the electric power from the secondary battery to the one or more electric devices,
the secondary battery including
a cathode containing a cathode active material that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak ($IP=[I2/I1]\times 100$) satisfies $0.25\leq IP\leq 1$;
an anode; and
an electrolytic solution, $$Li_aNi_bM_cAl_dO_e \qquad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45\leq b\leq 1$, $0\leq c\leq 1$, $0\leq d\leq 0.2$, $0<e\leq 1.98$, $(c+d)>0$, and $(b+c+d)\leq 1$.

11. An electric power tool comprising:
a secondary battery; and
a movable section that is supplied with electric power from the secondary battery,
the secondary battery including
a cathode containing a cathode active material that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak ($IP=[I2/I1]\times 100$) satisfies $0.25\leq IP\leq 1$;
an anode; and
an electrolytic solution, $$Li_aNi_bM_cAl_dO_e \qquad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45\leq b\leq 1$, $0\leq c\leq 1$, $0\leq d\leq 0.2$, $0<e\leq 1.98$, $(c+d)>0$, and $(b+c+d)\leq 1$.

12. An electronic apparatus comprising a secondary battery as an electric power supply source, the secondary battery including
a cathode containing a cathode active material that includes (A) a main phase and a sub-phase, (B) the main phase containing a first lithium compound represented by the following formula (1), and (C) the sub-phase containing a second lithium compound that contains lithium (Li), aluminum (Al), and oxygen (O) as constituent elements, wherein the second lithium compound comprises $Li_5AlO_4$,
wherein one or more first peaks resulting from (003) plane of the main phase and one or more second peaks resulting from the sub-phase are detected by an X-ray diffraction method, and a ratio IP of maximum intensity I2 of the second peak with respect to maximum intensity I1 of the first peak ($IP=[I2/I1]\times 100$) satisfies $0.25\leq IP\leq 1$;
an anode; and
an electrolytic solution, $$Li_aNi_bM_cAl_dO_e \qquad (1)$$

where M is one or more of cobalt (Co), iron (Fe), manganese (Mn), copper (Cu), zinc (Zn), chromium (Cr), vanadium (V), titanium (Ti), magnesium (Mg), and zirconium (Zr), and "a" to "e" satisfy $0.8<a<1.2$, $0.45\leq b\leq 1$, $0\leq c\leq 1$, $0\leq d\leq 0.2$, $0<e\leq 1.98$, $(c+d)>0$, and $(b+c+d)\leq 1$.

* * * * *